United States Patent [19]
Wootten

[11] Patent Number: 5,902,524
[45] Date of Patent: May 11, 1999

[54] METHOD AND APPARATUS FOR HEAT TREATMENT OF AN EXTRUSION TO EXTRACT CHEMICALS AND GASES FOR INJECTION INTO A SECOND COLD EXTRUSION OF INERT MEDIA TO COMBINE AND LIQUEFY THESE IN PRODUCTION OF A PRODUCT

[76] Inventor: William A. Wootten, P.O. Box 62466, Boulder City, Nev. 89006

[21] Appl. No.: 08/653,967

[22] Filed: May 28, 1996

Related U.S. Application Data

[63] Continuation of application No. 08/190,754, Feb. 2, 1994, abandoned.

[51] Int. Cl.$^6$ ..................................................... C01B 31/00
[52] U.S. Cl. ........................ 264/29.1; 264/86; 264/177.14
[58] Field of Search ........................ 264/29.1, 37, 177.14, 264/209.2, 210.1, 210.2, 86; 425/72.1, 461

[56] References Cited

U.S. PATENT DOCUMENTS

| | | | |
|---|---|---|---|
| 3,008,187 | 11/1961 | Slade | 264/209.2 |
| 3,279,501 | 10/1966 | Donald | 264/209.2 |
| 4,031,123 | 6/1977 | Espino et al. | 260/449.5 |
| 4,065,483 | 12/1977 | Pinto | 260/449.5 |
| 4,072,625 | 2/1978 | Pinto | 252/373 |
| 4,087,449 | 5/1978 | Marschner et al. | 260/449.5 |
| 4,107,189 | 8/1978 | van der Veen et al. | 260/404 |
| 4,119,656 | 10/1978 | Poutsma et al. | 260/449 R |
| 4,181,630 | 1/1980 | Baglin et al. | 252/476 |
| 4,181,675 | 1/1980 | Makin et al. | 260/449.5 |
| 4,203,915 | 5/1980 | Supp et al. | 260/449.5 |
| 4,219,412 | 8/1980 | Hassall | 209/399 |
| 4,235,800 | 11/1980 | Pinto | 260/449.5 |
| 4,238,403 | 12/1980 | Pinto | 260/449.5 |
| 4,266,798 | 5/1981 | Smith | 280/481 |
| 4,271,086 | 6/1981 | Supp et al. | 518/704 |
| 4,798,696 | 1/1989 | Boen Per | 264/209.2 |
| 4,938,908 | 7/1990 | Shiraki et al. | 264/209.2 |
| 5,011,625 | 4/1991 | Le Blanc | 252/376 |

OTHER PUBLICATIONS

Article by Reuel Shimmer in Chemical Engineering Science, vol. 43, No. 8, pp. 2303–2318, 1988 entitled "Thermodynamic Analysis of Chemical Process and Reactor Design".
Koppers–Becker combination oven (1 page), p 46 Fig. 4–26.
Thermal diffusion apparatus (1 page), p. 48 Fig. 9.
Ionization of diatomic and polyatomic molecules (1 page), p. 99.
Fractions of coke–oven light oil, and boiling points of some of their constituents (1 page), p. 46.
Van Der Waals' constants for gases (2 pages), p. 43.

*Primary Examiner*—Christopher A. Fiorilla
*Attorney, Agent, or Firm*—Pollock, Vande Sande & Amernick, P.L.L.P.

[57] ABSTRACT

A method and apparatus in which an extruder with vacuum evacuation and gas injection means is multi-charged with a plurality of materials to extrude these over streamlined fuel-admitting pipes to make a laminated tubular feedstock serving as a moving enclosure for an intense fire with a fusible liner-layer of encapsulating glaze shielding the said feedstock outer lamination as it exits the said nozzle to telescope within a rotating perforated support tube that permits the centrifugal escape of heat-generated fluids and gases within a prior evacuated, pressure-modulated enclosure from which said gases are fractionally expelled to thermal diffusion and centrifugal/parabola/cyclotronic means providing molecular division by mass and weight after which the said divided gases are delivered into an evacuated inert media mass of particles moving in a like extrusion means to a like said rotating perforated tube but with elimination of the said laminated extruded lining replaced by a permanent solid support tube creating a torus space between it and the said perforated tube to retain the said inert media that churns in rotational passage to combine the injected gases and chemicals in formation of a product cooled by an exotherm-controlling cold gas or fluid driven through the center of said supporting tube which said cold causes the hot gases to reach liquefying vapor pressure points and exude from the said perforated tube into the enclosure for collection.

10 Claims, 27 Drawing Sheets

44

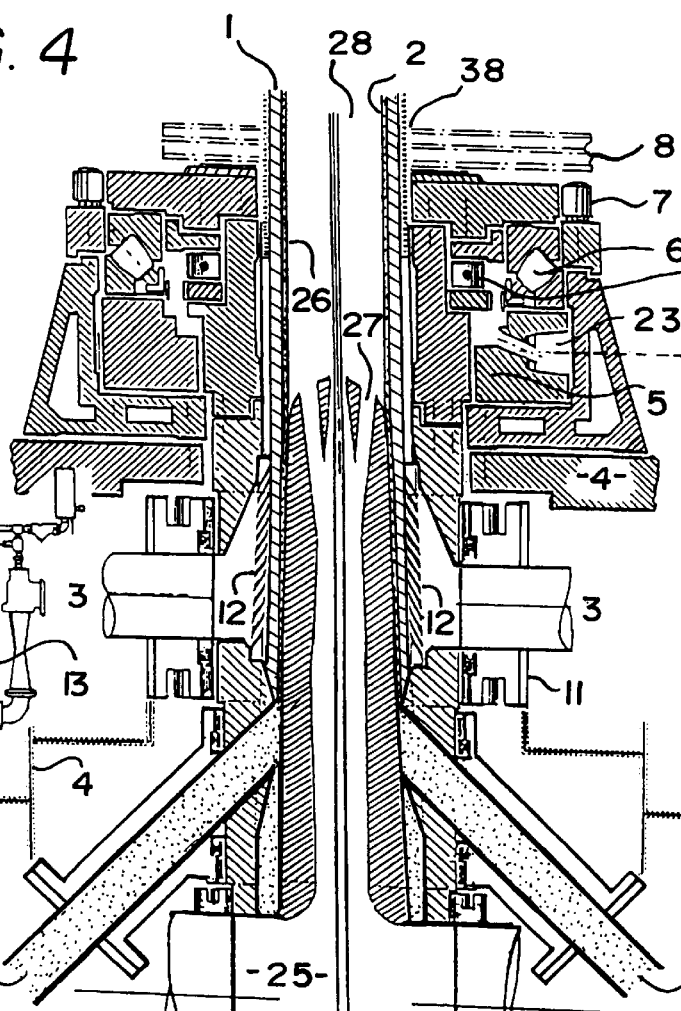
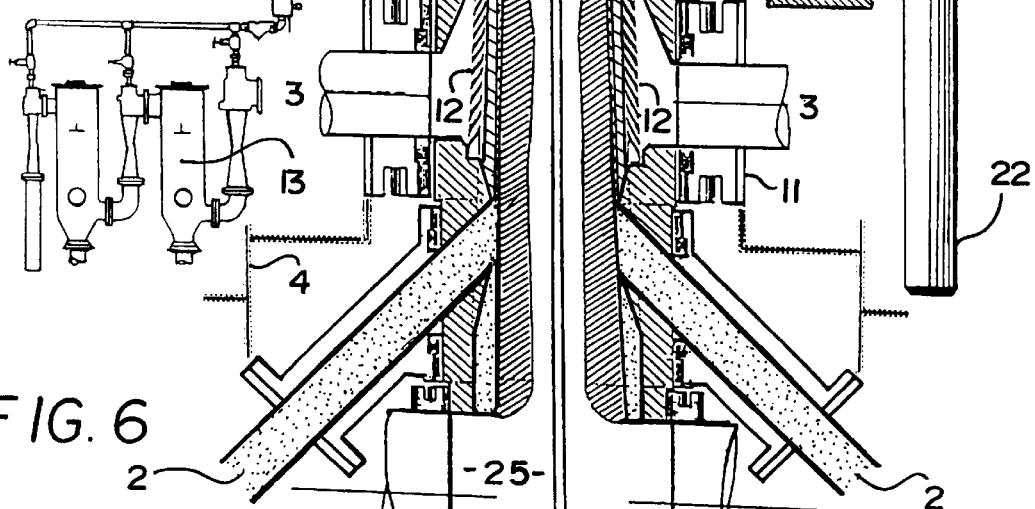
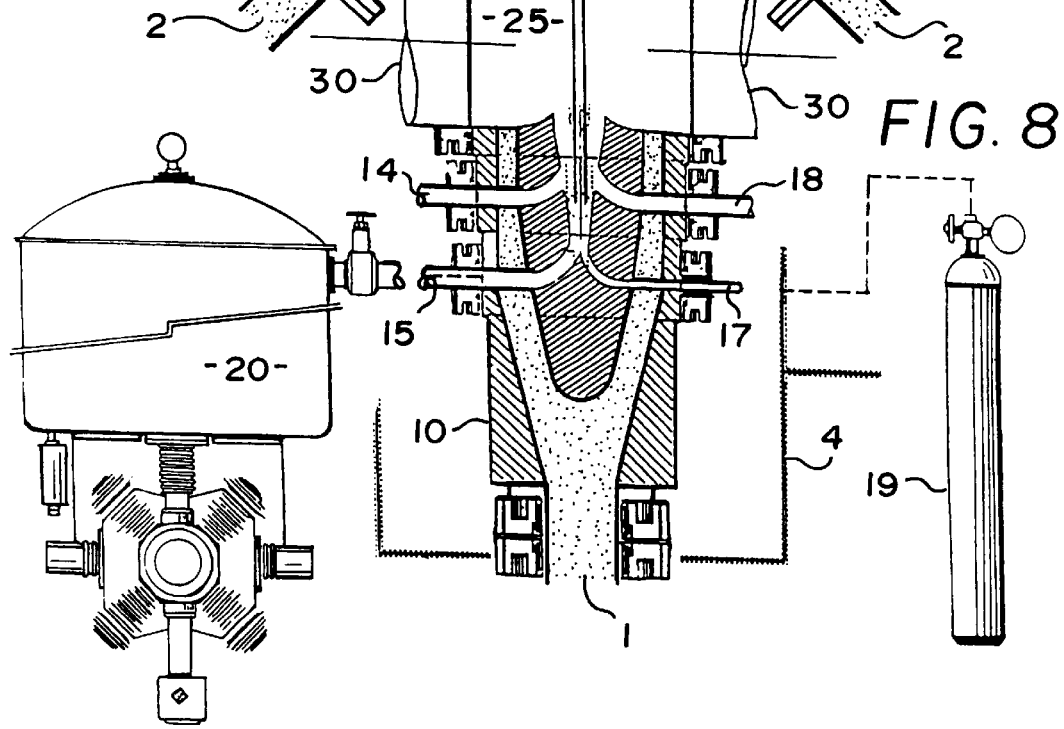
FIG. 4
FIG. 5
FIG. 6
FIG. 7
FIG. 8
METHOD II & III

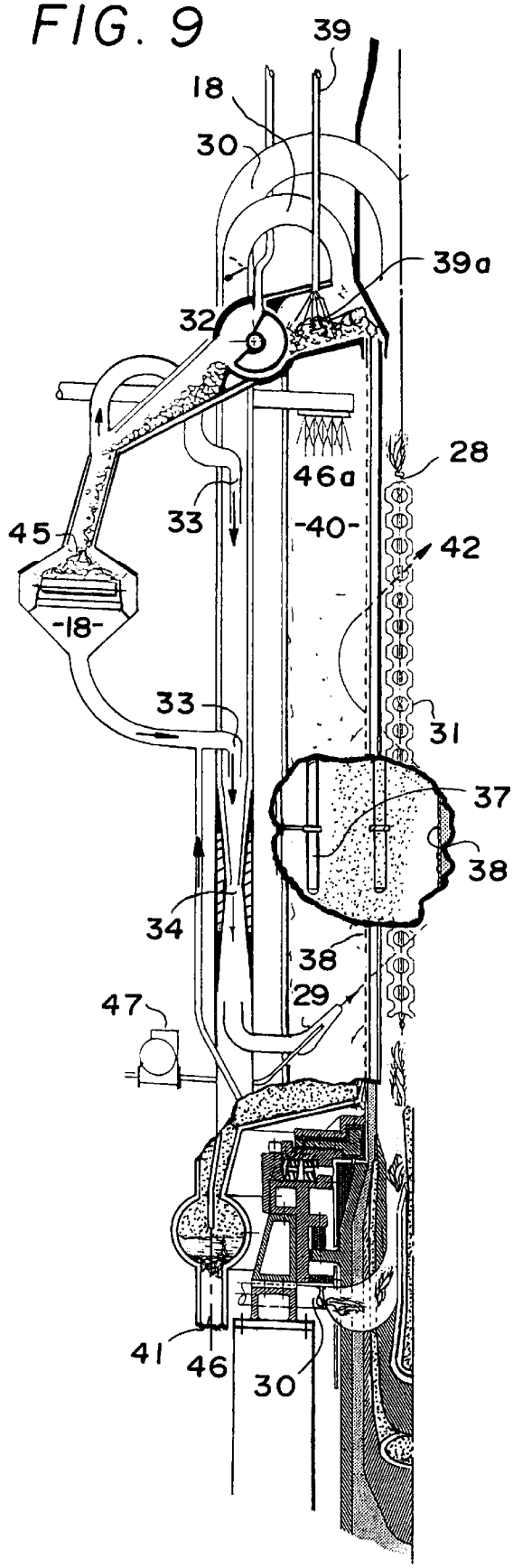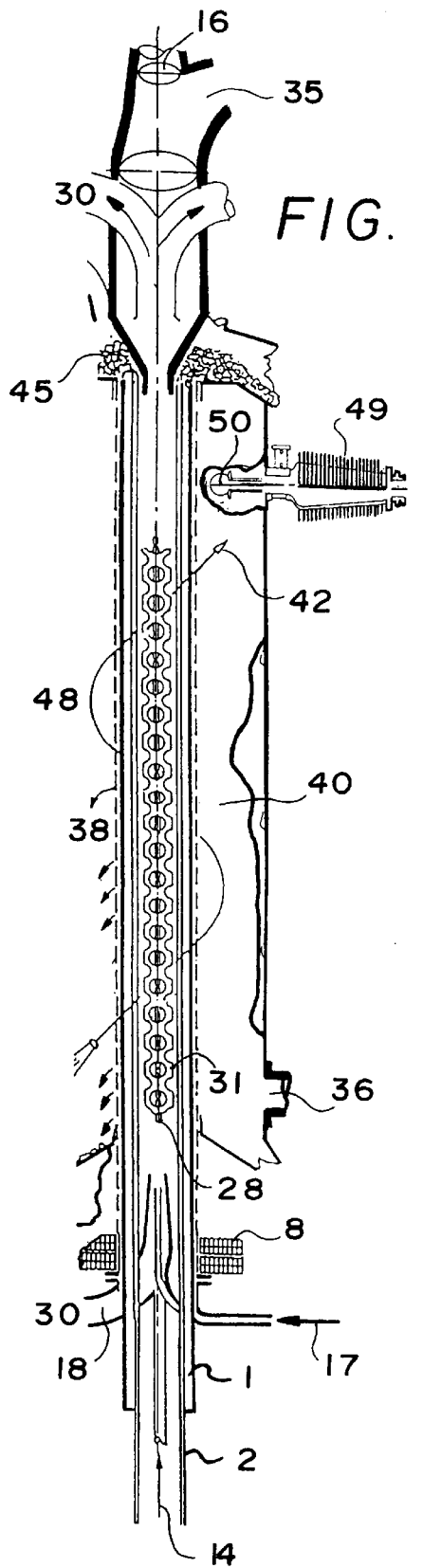

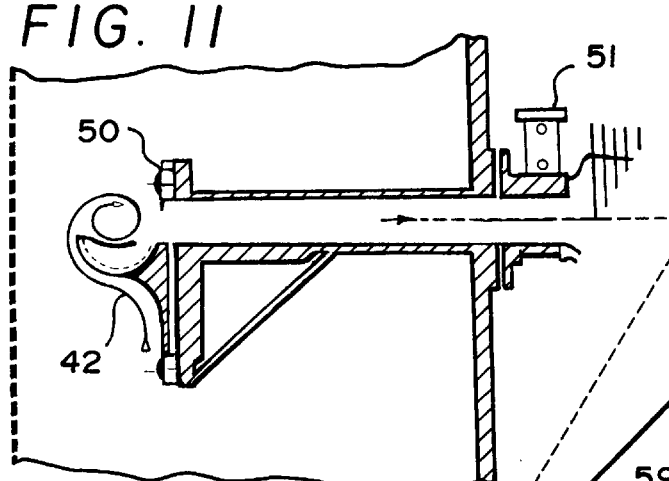
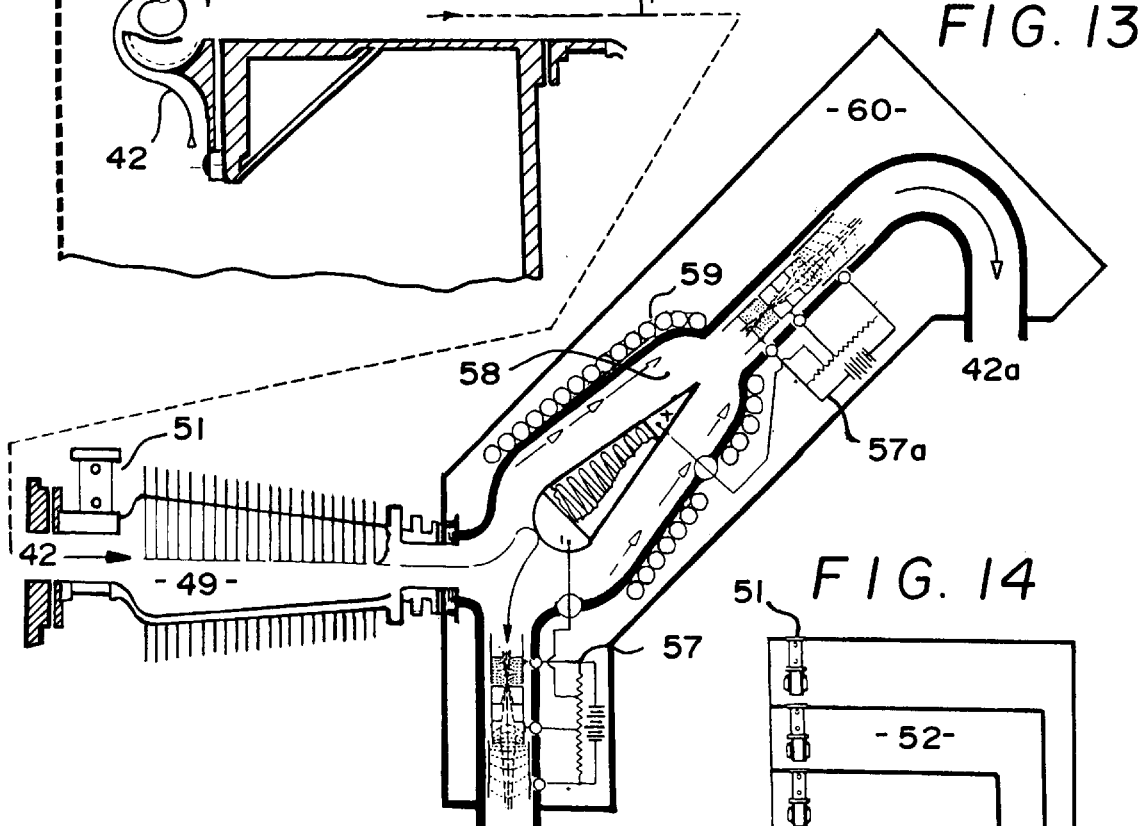
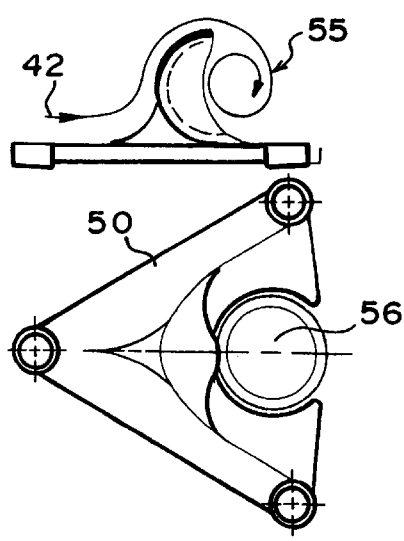
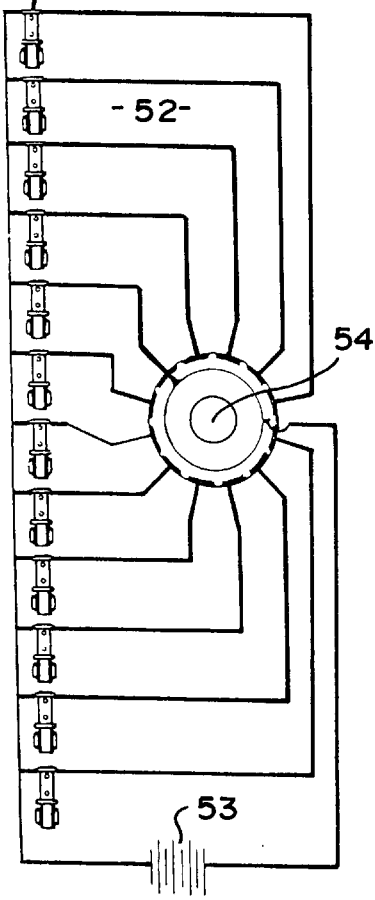
FIG. 11
FIG. 13
FIG. 14
FIG. 12

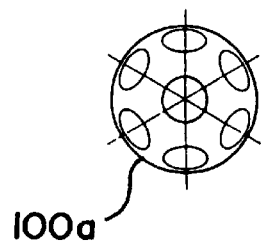
FIG. 24
FIG. 25
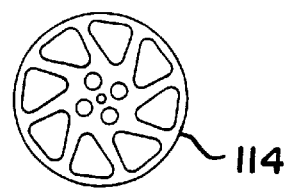
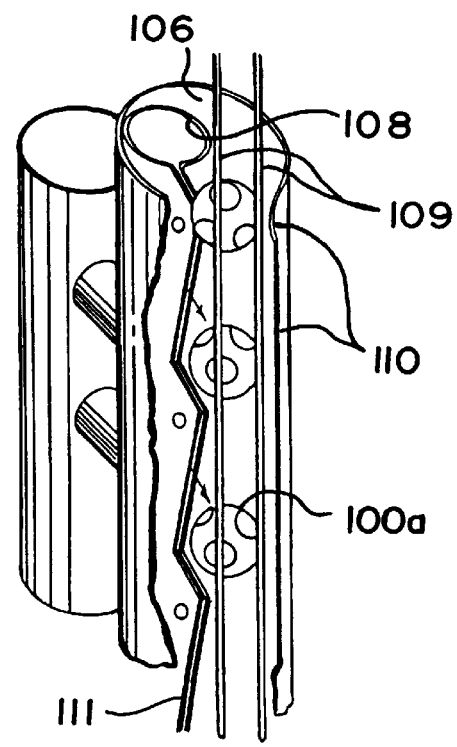
FIG. 26

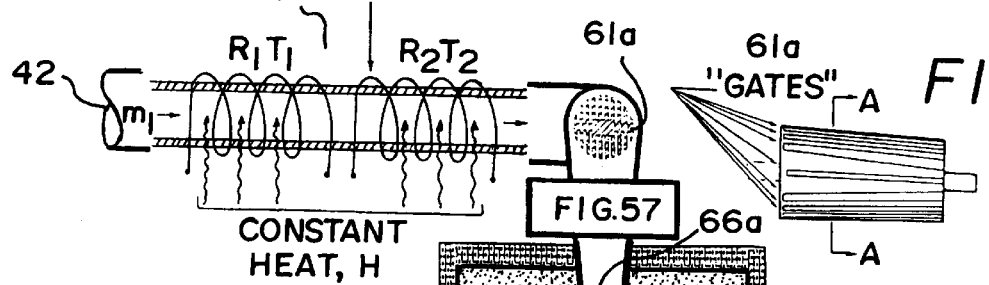
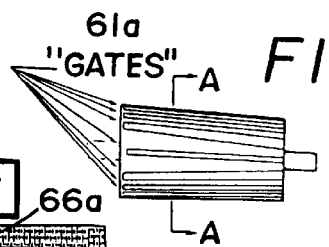
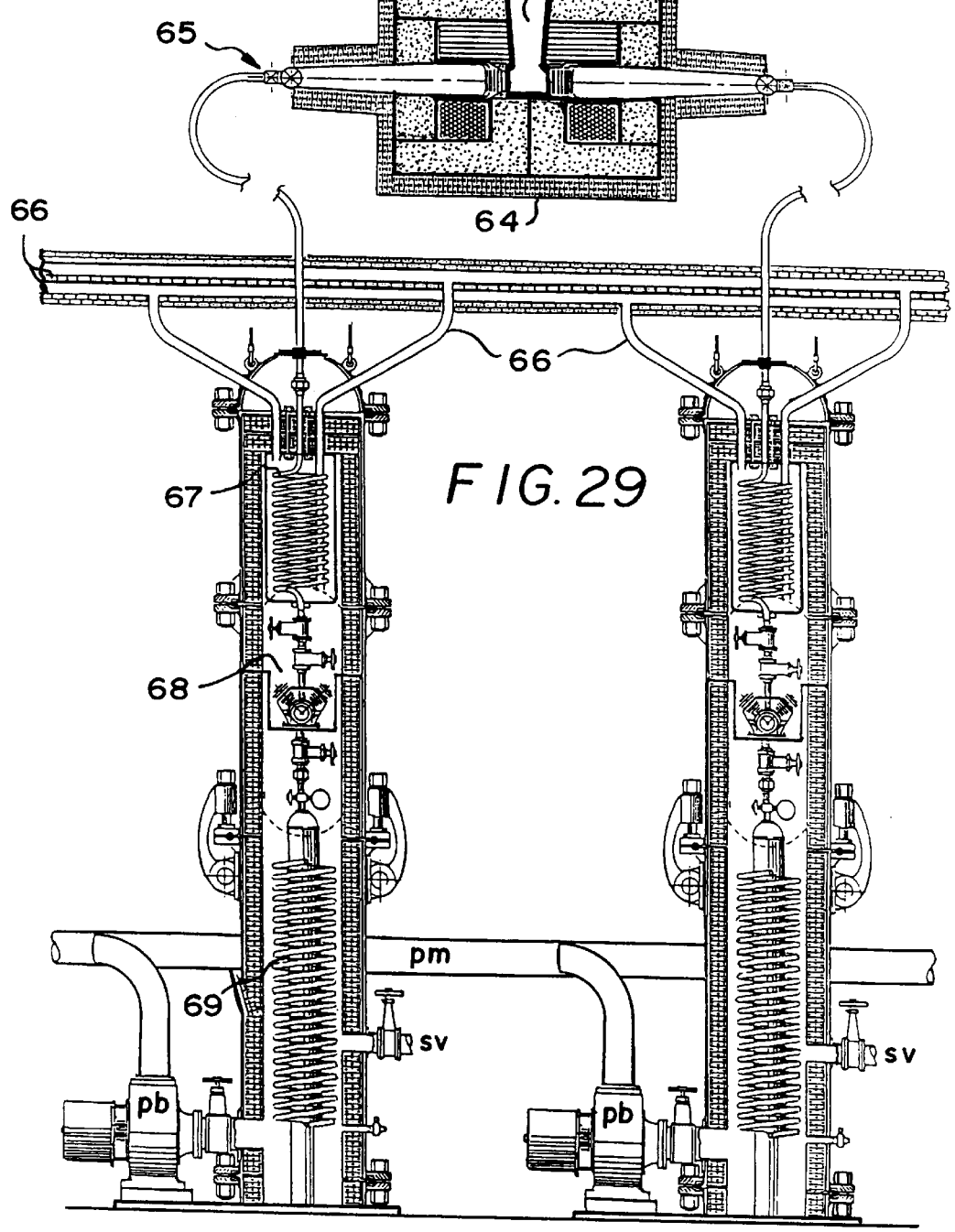

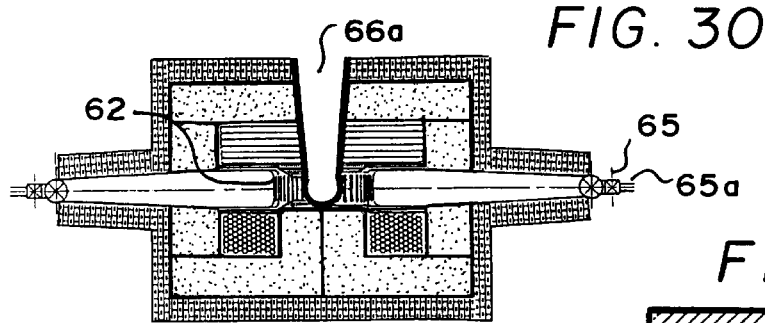
FIG. 30
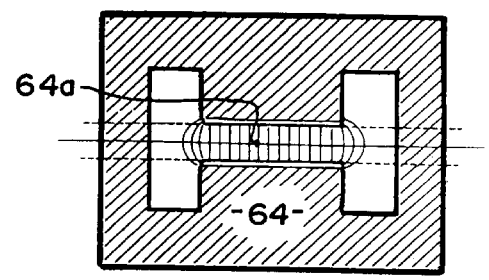
FIG. 32
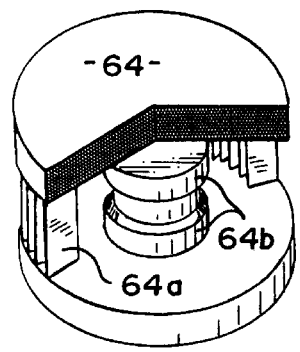
FIG. 31
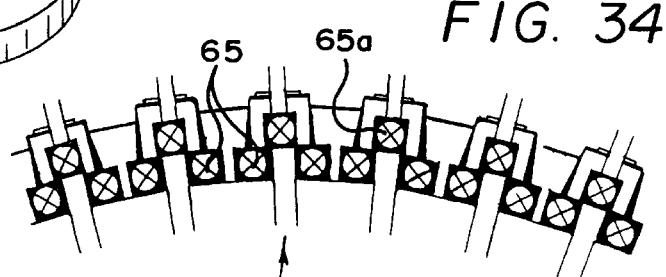
FIG. 34
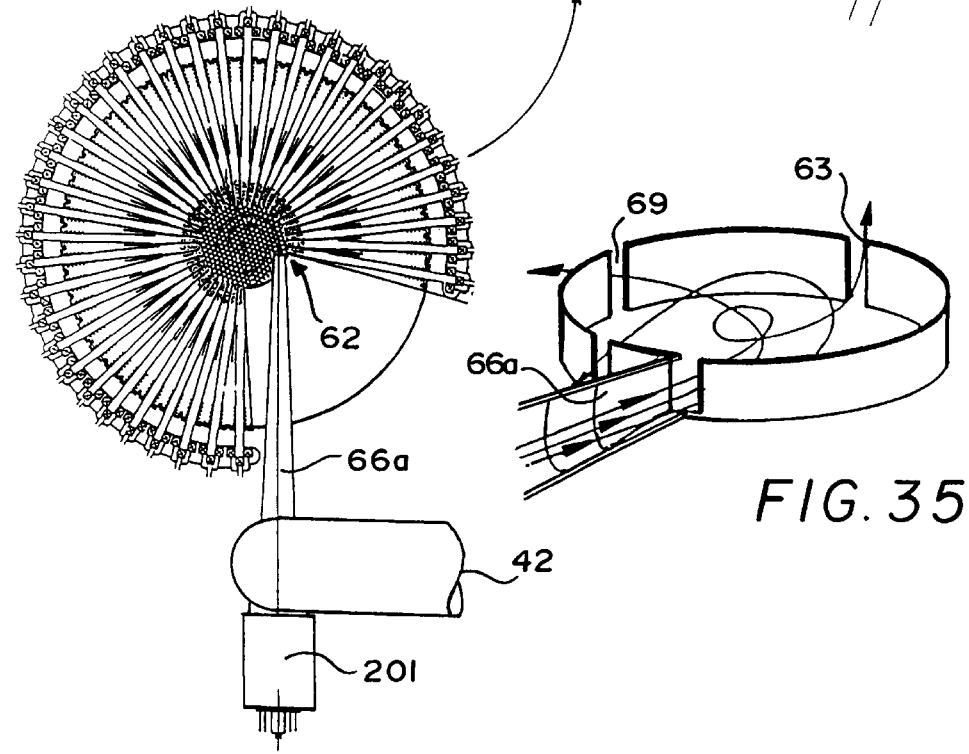
FIG. 33
FIG. 35

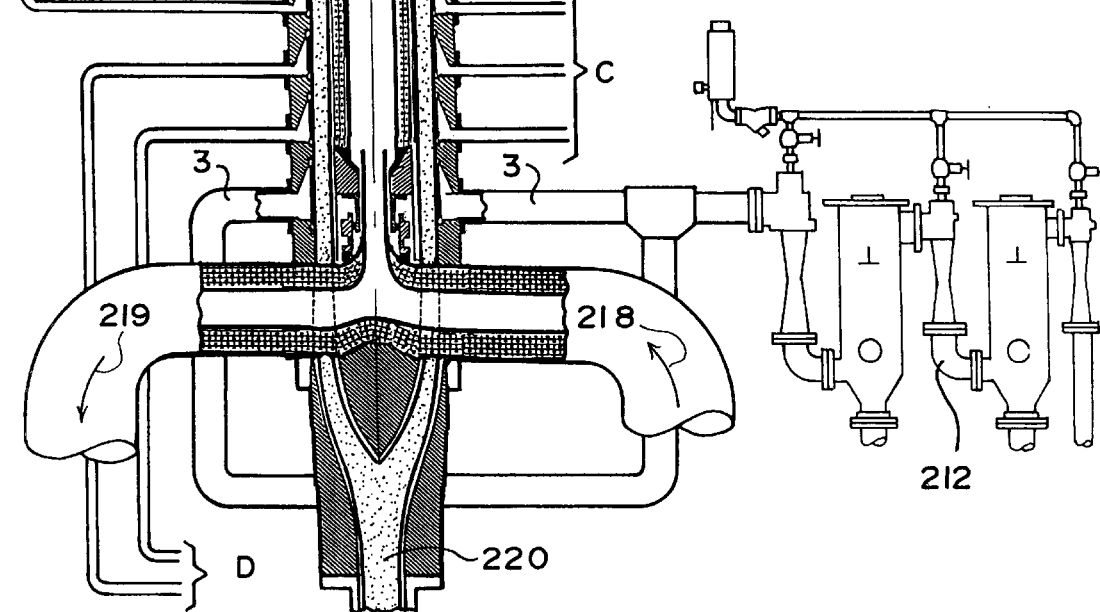

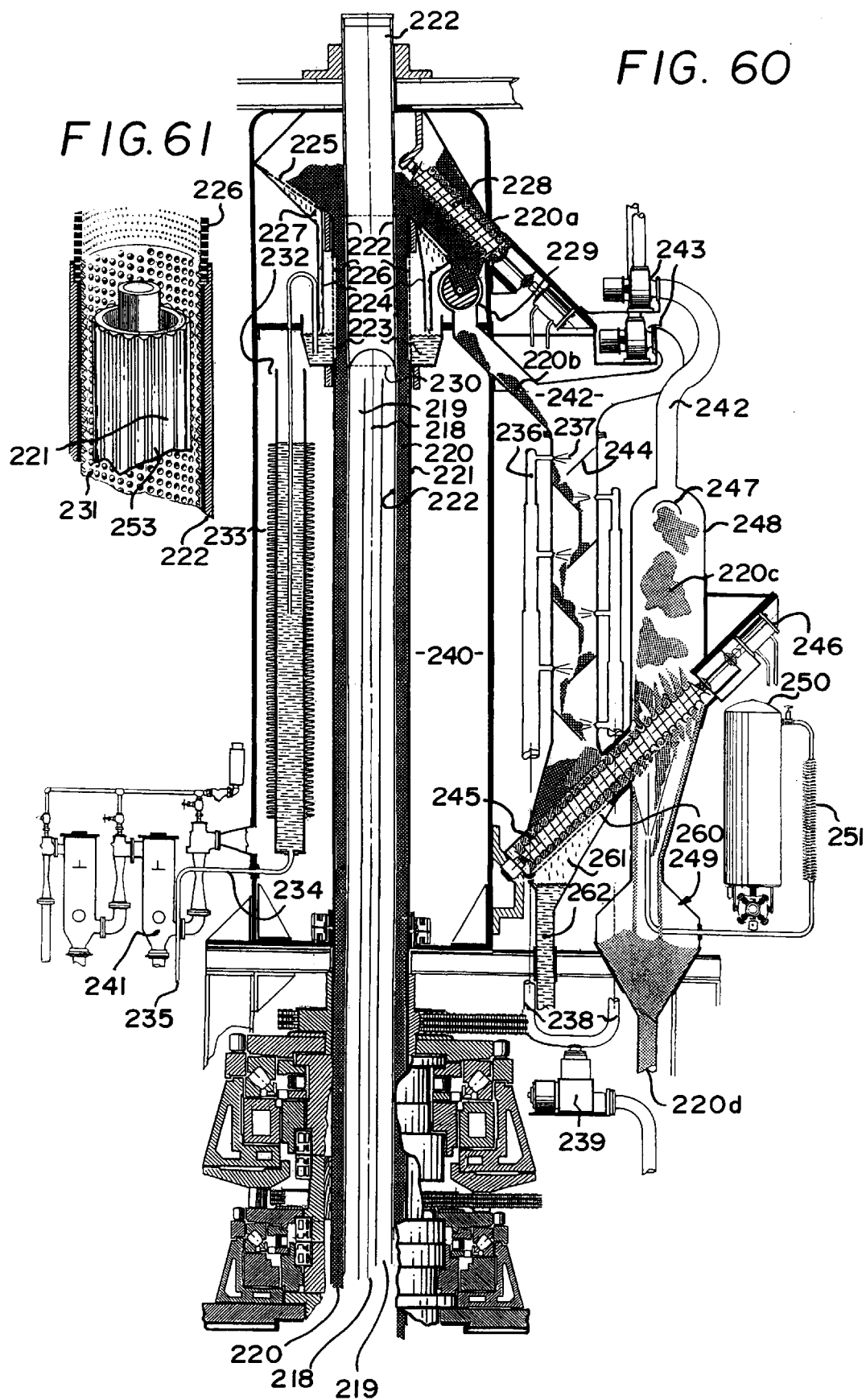

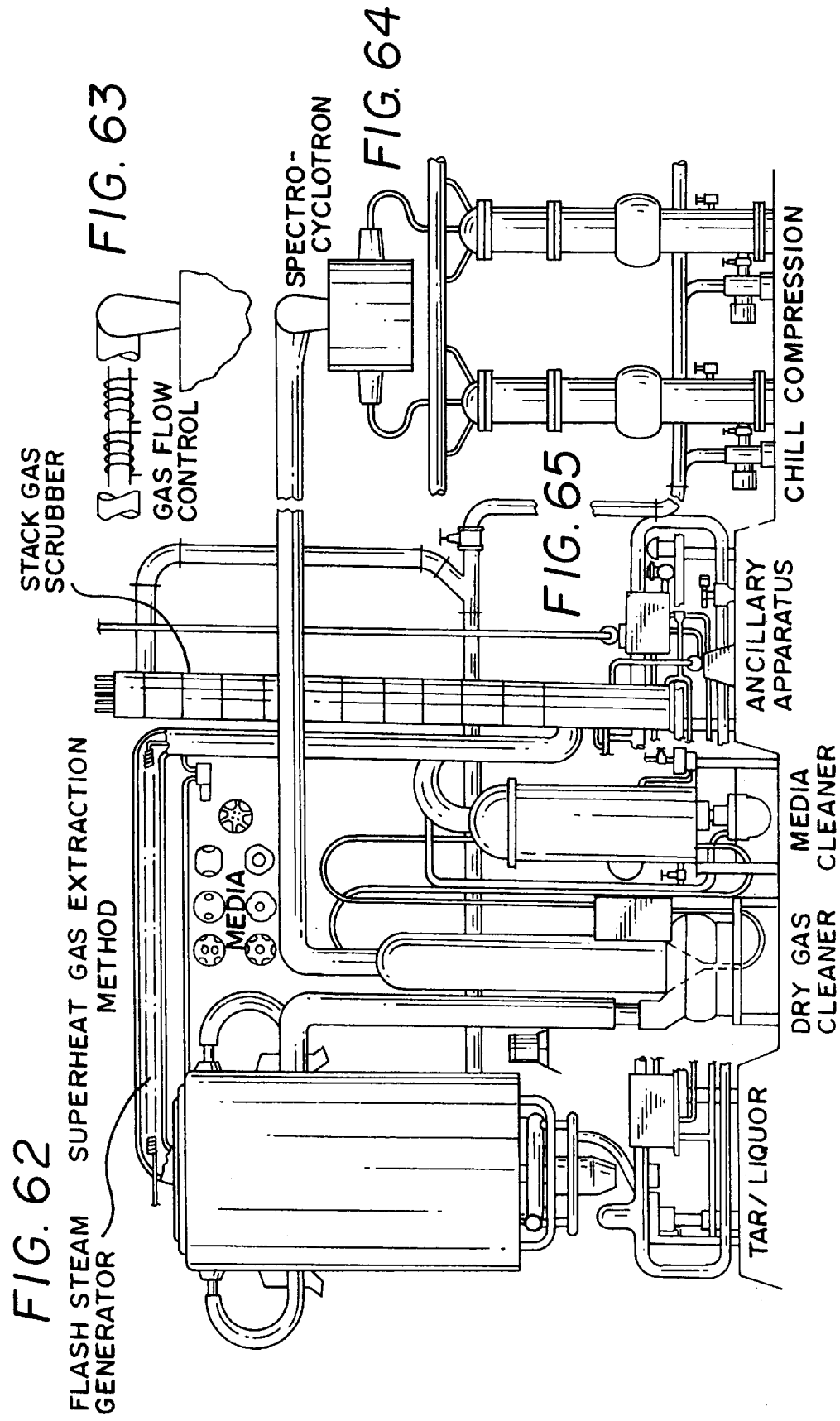

FIG. 66 FLASH STEAM GENERATOR SUPERHEAT GAS EXTRACTION METHOD

FIG. 69 SPECTRO-CYCLOTRON

METHOD AND APPARATUS FOR HEAT TREATMENT OF AN EXTRUSION TO EXTRACT CHEMICALS AND GASES FOR INJECTION INTO A SECOND COLD EXTRUSION OF INERT MEDIA TO COMBINE AND LIQUEFY THESE IN PRODUCTION OF A PRODUCT

This is a continuation of application Ser. No. 08/190,754, which was filed Feb. 2, 1994, abandoned.

BACKGROUND OF THE INVENTION

The existing processes for the production of coke from coal and the varied systems used for disposal of waste plastics and paper products are totally unsatisfactory ecologically and generally non-productive with respect to the gas driven off these processes.

Coke production for steel manufacturing as practiced now involves huge machines and ovens of great length and complexity that are grossly inefficient in heat consumption and atmospheric contamination. Volumes of toxic gases escape and such ovens are being banned by regulatory agencies.

Coke is preferred by some steel makers over the use of electric ovens, but the blast furnaces are being condemned as well. [The inventor believes that a suitable means for preparing coke might lead to efforts to enclose the blast furnaces so the expelled gases could be captured and used as is taught in this process and the steel making procedure might be revived.]

Great volumes of waste plastic, carpet fibre, glass, rubber tires and paper are buried, or are simply accumulating because of landfill closing and the inability of cities and counties to provide a properly approved system for disposal that conforms to ecological laws and restrictions.

The design of conventional apparati described in the prior art foretells the use of this extraction method for the processing of coal, other ores, waste plastic, tires and even petrochemical plant "tank-bottom". Ground waste glass could be used in the fusible lining of the feedstock and in some of the extruded ore feedstock forms processed. The gases accumulated will be separated by molecular weight and mass procedures to subsequently be recombined using a processing procedure that is essentially the opposite of the hot extraction process. In this process virtually the same apparatus uses cold in the recombination of the separated gases to produce products from materials reduced in the hot process.

There are coal ores in abundance throughout the world which are most frequently of low quality BTU levels and the procedure of this invention provides a means to upgrade such by the application of controlled heats to reduce water and sulfur contents. In addition the process of this invention permits the infusion of gases or chemicals to enhance features of the coal so its BTU performance can be of uniformly high quality when shipped and thereby reduce tonnage. In the processing of such enhancement the addition of certain gases to the coal and recovery of gases in the coal combined with those added can generate recoverable gas with values to offset or exceed costs associated with this enhancement procedure.

DESCRIPTION OF THE INVENTION

There are four process methods in this invention with features that are generic in form and function.

Process or Method I is a basic method placing emphasis on the production of gases and liquors at relatively low temperatures so they can be accumulated and used in refining procedures common in such production.

Process II form uses the same low heat procedure to perform a rough gas fractioning and Thermal Diffusion classification of the gases into light and heavy molecular weights for storage and refining by others.

Process III method comprises use of similar apparatus, but in a high temperature form. Here very high temperatures impart high velocities to the gases produced as well as the heat circulation system. The latter is accomplished with auxiliary power input from Ramjet Engines as a fire-tube drive. There is no fractioning in the main chamber or MGC. The emphasis in this process is to provide a complete gas cleaning and refining procedure so a finite division of unfouled hot gases can be classified, based on molecular weight and mass using collimation and Spectro-Cyclotronic means.

Process IV makes use of the extruder and an evacuated enclosing chamber common to all of the processes including the vacuum evacuation at the extruder nozzle and a large plurality of gas injection ports rather than one or two as in the prior processes. Thus there is a generic relationship.

The nozzle of this extruder has only one material input or feed. The material feed is an inert mass of particles or small shapes like glass balls, alumina, or the like. The spaces between these are powerfully vacuum evacuated in passage through the nozzle. The classified hot gases accumulated from the gas divisions produced in the systems of the collimating and Spectro-Cyclotronic separation equipment of the Process III are injected one by one into this material in nozzle passage. This is a stationary nozzle as in the basic Process I. As the media exits the nozzle it moves past one or a series of rotational speed changes followed by the turns of the perforated retention tube. These transitional speed changes are augmented by internal annular serrations surrounding the extrusion which churns the media mass in passage to mix the hot gases that are trapped in these spaces between particles.

The extruder function in this case is to provide light compression and push this lightly compacted mass of particles and hot gases through the churning point and beyond to be retained between the retention tube and a solid center tube (replacing the extruded liner of Processes I, II and III) which tube conducts a flow of very cold gas in its center that cools the gas combination to the vapor pressure levels. These tubes have a pattern of shapes on their surfaces interfacing the media mass to aid in continued mixing. Perforations in the retention tube do not occur until the top of the column is reached and here the liquids of the gas combination escape. At the extreme top of the tube column the media particles fall away through a solvent cleaning operation. are extracted, dried and then returned to the extruder nozzle. The product taken off is some chemical form of the original material processed in III excluding the carbon portions. Chemical and gas additions can be made at the nozzle to add to those extracted in Process III to make a desirable product. Water accumulation can be controlled by care in proper vacuuming with sufficient media exposure and the maintaining of injected gas pressures. Liquids at the top of the column close the media at that point.

Apparatus Details and Processing Procedure

1. A feedstock is extruded from a special Extruder Nozzle in the shape of a tube ranging from six to eighteen inches in diameter with a wall thickness ranging from one-half inch to two inches in thickness.

2. As it is extruded the feedstock is vacuum evacuated.

3. Gases and/or chemicals can be injected after evacuation at the extrusion nozzle.

4. A second extrusion material is introduced into the Extruder Nozzle and a tubular form is extruded simultaneously with the feedstock and introduced inside the first feedstock tube. The make-up of this second form comprises materials that melt and blend into the inside wall of the feedstock tube to seal its inner surface with a "glaze" or non-porous carbonized face that excludes oxygen but permits efficient direct heat penetration.

5. The pair of extruded tubes, thus formed together, are forced into an increasingly smaller diameter extension of the Extruder Nozzle as the materials pass streamlined gas, oxygen, fuel, air and fire tube pipes that support the fire in the center of the extrusion.

6. At the end of the Extruder Nozzle is a metal or ceramic support or perforated Retention Tube ranging from fifteen to one hundred feet in length (or height). This tube and the extruder nozzle are rotated on a common axis at a speed ranging from 50 to 500 rpm. The Extruder Nozzle that rotates with the Retention Tube is equipped with large shaft-type mechanical rotary seals set as annular rings around the outside of the Extruder Nozzle. These permit introduction of fire support gases, evacuation of the feedstock and the addition of gases and chemicals through a plurality of passing ports allowing intermittent egress to the streamlined feed-pipes and the exposed center of the dual extrusion as it leaves the Extruder Nozzle and enters the Retention Tube.

7. With very slow rotation of the Retention Tube, the Extruder Nozzle can be held stationary and all piping made hard. The "slip" characteristics of the sealing liner provide a type of "potterwheel" treatment as the extruded tubes are passed from the static end of the Extrusion Nozzle into the bottom end of this turning Retention Tube. An additional bearing assembly can be provided as in Process IV which makes a speed transition to help the transfer from a static nozzle to a rotating Retention Tube.

8. Centrifugal forces help in holding this somewhat plastic material against the inside wall of the Retention Tube, particularly at higher speeds.

9. The long Retention Tube is supported on proper thrust and radial bearings. It is perforated with slots, slits or normal round perforations and mounted to accommodate heat expansion and it is equipped with rotary seals so its ends extend top and bottom from the fixed stator-like enclosing chamber, MFC or MGC.

10. This Main Fractioning Chamber or MFC is evacuated as the process starts. In the low temperature type of operation in which this enclosure functions as a fractioning tower after heat builds on the Retention Tube, small steam jets inside the chamber are directed at the Retention Tube's outer surface to provide a temperature differential from that of the feedstock and glaze lining which interfaces the heat. This cooler outer surface is held in a range of 200 to 400 degrees F. lower than the glazed side interfacing the heat.

11. As the extruded feedstock and protective internal tube moves upward inside the Retention Tube and into the heat, its protective material fuses into the feedstock and forms the carbonized "glaze" that encapsulates its inside surface. Thus protected, ignition is prevented and instead of the massive insulation associated with coking ovens and the like, the feedstock tube itself directly encloses all the heat provided and uses it at maximum efficiency.

12. The perforated side of the retention tube provides a "muffling" condition in spite of the perforations.

a. In the I and II Processes Temperature Fractioning Systems, steam is used (as note above) in this chamber for cooling and circulatory functions, but the positive gas and liquor pressures building inside the feedstock cause these to exude from the perforations and prevent loss of the muffling conditions on the feedstock side of the Retention Tube inner surface.

b. In the Process III High Temperature non-Fractioning or MGC chamber there is only a gas atmosphere on the outside of the retention tube.

13. As the protected feedstock form moves upward it slips inside the perforated Retention Tube because liquids are driven to the interface between the feedstock and the inner surface of the retention tube. For example, coal produces a tar. This liquid bubbles through perforations with gases urged by centrifugal force, the movement of heat toward cooler surfaces and capillary action.

14. At the top of the Retention Tube the feedstock is broken as a pyrolysis material and falls under a water jet spray that produces a "Water-gas" (in the case of coke) that is captured and returned to the base of the chamber after passing a heat point to provide a gas/steam "super-heat" velocity for ejectors involved in powering the heat-tube movement and gas vortex inside the MFC. Ejectors also exhaust gases above the run-off liquids so they are driven upward to recirculate in the mfc.

15. The liquids and tars accumulate by gravity in a main at the unit base and are pumped to a decanting vessel where heavy elements are removed (tar in the case of coal) and liquid (ammonia liquor in the case of coal) and are circulated back for the reintroduction of this liquor as jet sprays in the Gas Fractioning Chamber. The liquor then flashes into gases to combine with others. (This is only done in Processes I and II.)

16. The heat of this system is provided with a mix of natural gas, high pressure air/oxygen and Water-gas from cooling of incandescent pyrolysized residue. The compressed air, gases and oxygen for the fires are introduced from the bottom of the MFC and through the Extruder Nozzle using streamlined-shaped pipes over which the flowing extruding material passes. The material closes after this passage by restrictive forming and the extruded tubes reconstitute themselves. The fire impacts the glazed protective surface of the liner extrusion all the way to the column top and the flames are drawn off here by a low vacuum created by a venturi effect at the point of fuel admission. Every effort is made to pull the actual flames back to the bottom of the unit to be reintroduced with a new fuel-air-oxygen mix in a regenerating type of heating system. Hanging in the center of this heat pipe is a holed-ceramic heat sink through which the flames course to be stimulated by oxygen injection at intervals to provide an incandescent radiator immediately adjacent to the encapsulated feedstock.

a. The flame and heat return described here is that of the I and II Processes.

b. In the III Process the heat return and circulation is provided by a plurality of small Ramjet Engines.

17. In this passage of heat and flame from top to bottom it moves over a conduit containing Water-gas-steam from the product cooling at the top. This heat addition superheats the steam for the jet drives that power the gas vortex in the main fractioning chamber and can provide other heat needs in the system.

18. Hot gases and fumes escape past control dampers in the stack and are redirected to a cooling tower and scrubber that uses the cooled extracted liquor that cascades over baffles as it falls against the rising fume gas. Heavy products accumulate at the bottom and contribute to the liquor viscosity, while tars go to the decanter. The cleaned fume gas is reintroduced to the bottom of the MFC.

19. In the I and II Processes the enclosing chamber surrounding the Retention Tube is a fractioning tower. A series of openings ranging from the bottom to the top of the MFC are uniformly spaced vertically and around its cylindrical form. A gas valve controls each opening. These are opened individually and only one at a time. The time-pause between the openings is uniform and provides a modulated pulse of pressure in the MFC.

a. This procedure is not used in the enclosing chamber or Main Gas Chamber (MGC) of the III Process.

20. In the II Process, tubes extend from these valves into the MFC about two-thirds of the chamber's internal space between its outer wall and the outer surface of the retention tube where new gases are being expelled. This reduces the collection of heavy liquor vapors that are condensing on the outer wall of the MFC. The extreme end of this tube is fitted with a device to create an eddie effect in the circulating gases, causing some to dwell at the pipe opening. As the valve is opened a sudden pressure drop occurs at this opening because a cooled chamber is at the opposite end of this exhaust pipe. The dwelling gases are sucked into this vessel and other gases passing the pipe end follow until the valve closes. The cooled vessel outside the MFC is the Primary Gas Receiver for delivery to a molecular mass and weight selection process that follows.

a. This procedure and the Primary Gas Receiver are used in Processes I, II and III.

21. Gas from the Primary Gas Receiver passes to an Electrostatic Accelerator and Thermal Diffusion Apparatus employing temperature differential to divide the gases into two classifications based on molecular weight. The Thermal Diffusion section of this unit has at its center a refrigerated and shaped vessel suited to application of electronic space charges. This is enclosed in turn by a heated and grounded jacket, spaced uniformly on all sides in relation to the internal vessel. Hot fractioned gases are drawn through this space and are separated in their attraction to the hot outer walls and the shaped inner cold surfaces. A steam coil on the outside of the enclosing jacket maintains a uniformly heated surface and a uniform temperature differential between this surface and that of the cool internal unit. The exiting ports carrying the separated gases are fitted with electrically charged cathode type accelerators to help expel the gases to their respective cooling, drying and compression units.

22. One of these combination units consisting of the Primary Gas Receiver and the Thermal Diffusion Unit, as described above, is located at each port level of the MFC. They are arranged in a "pipe organ" fashion with the egress of each at the level of the port it serves. These ancillary chambers lend themselves to the use of selective catalysts on the inner surfaces. These would be of the heterogeneous type, Iridium, Osmium, Platinum, Rare Earth Elements, Rhodium and Ruthenium suited to the selection of specific gases. (The renewable cathode as described in the III Process would be usable in this apparatus too.)

a. This procedure is used in the I and II Processes.
   b. In the III Process the Thermal Diffusion unit can be eliminated or can be employed as a single unit accepting the entire mass of gas for separation into two gross molecular weights prior to the passage of these into two Spectro-Cyclotronic Division and Classification Units that are described below.

23. The mass of gas varieties produced, regardless of the feedstock employed, do not combine effectively and as the internal vortex motion occurs inside the MFC or the MGC and over the outside surface of the Retention Tube (in a direction opposite to its rotation) new gases are scrubbed off the tube perforations and other gases are produced from the liquor vapors falling from above that heat exposure vaporizes. Shaped fins on the inside of the chamber's outer wall are mounted on heat tubes (as in Process III) to create some rough stratas of common size and mass. This provides gross fractioning by molecular weight and mass at different levels (theory explanation below). The control of heat and pressure in the MFC could actually create a "cracking" condition that might be an additional consideration, but this requires considerable experimentation and will be a part of other apparatus applications if feasible.

24. The products produced with this system are:

(a) a variety of gases of different molecular weight and mass. These gases contain the constituents of the feedstock minus the liquors, tar and carbon residue produced in the I & II Processes. In the III Process the high heat produced is intended to eliminate all but the carbon residue. There should be no liquor or tars produced so the gases produced in the III Process should represent everything except carbon in the make-up of the feedstock. The gases produced in the I and II Processes are cooled and compressed as produced and subsequently refined by gas producers. The gases of Process III are subjected to a different non-fouling Media Cleaning System and separated with the intent to recombine these separations into a product on the site of the III Process using the IV Process that has not been described in the above material.
   (b) a carbonized material such as coke, soft char or simply a carbon waste product depending upon the feedstock;
   (c) a dense refinable liquor (see list of extractable constituents from coal feedstock); and
   (d) a refinable tar.

25. As noted above the III Process emphasis is entirely different from that of the I and II systems. The extrusion function is identical but the heating system as noted earlier is augmented with a Ramjet that drives the heat and flame through the circuit at great speed and intensity. This creates higher heats and speeds the passage of the feedstock in heat exposure as well as accelerate the generation of gases, which is the intent. The gas temperature is maintained at the highest levels possible throughout the process so there are no liquors and tar.

26. In the III Process a gas cleaning system uses a hollow metal ball media to provide a particulate collection method for cleaning the gas with dry means so there is no change of chemistry during the cleaning process.

27. The III Process completes the gas refinement to an extreme in that every effort is made to reduce the gas volume to finite parts by the use of the Thermal Diffusion Procedure outlined earlier, the use of a massive electron generation means for ionized bombardment of the gas volume to create molecular disassociation, a parabola collimation in a space under centrifugal force influence and finally with use of the Spectro Cyclotronic magnetic field separation.

28. The IV Process is the final step that follows the reduction of an ore or waste product to carbon residue and the array of hot gases that have been separated by molecular weight. This Process should be on the site of the III Process and receive the hot gas directly from the Spectro-Cyclotron System.

Much of the apparatus of this process is almost identical to that of Processes I, II and III and comprises:

a. an Extruder Nozzle that has input for only one material, but has the usual port for vacuuming and a plurality to receive gas and chemical injections that are driven into the interstice between the media elements it controls;

b. a material that is not a feedstock but instead consists of an Inert Media material like glass or quartz beads, alumina shapes or any inert material that can be produced in small, preferably round, sizes of 1/16" to 1/8" that it gently pushes through;

c. the normal rotating Retention Tube mounted as in the other Processes, but with perforations near its top, rather than most of its length and in this unperforated length a series of convex raised surfaces are created on its inner surface by shallow detents in the outer surface that are in a helical pattern;

d. which said raised surfaces or "bumps" pass near the corrugations of a Support Tube that replaces the Glaze Liner provided inside the feedstock of the other processes and instead is a stationary non-corrosive vertically corrugated metal tube used to enclose the Inert Media in the torus space between its O.D. and the I.D. of the Retention Tube;

e. wherein the corrugations of the stationary Support Tube and the small "bumps" with an annular helical pattern that is on the inside surface of the rotating Retention Tube cause a churning or mixing action in the media as it and the gas content rises in this torus space between these members;

f. until it nears the top where it has been cooled by liquid nitrogen flowing in the Support Tube that shock cools the media supported combined gases to a vapor pressure level converting it to a liquid;

g. which escapes from the perforations at the unit top where it is quickly captured by an annular trap for recovery;

h. as the drained media spills over the top into a solvent tank for cleaning, after which it is dried with hot air blasts and returned to the extruder at the tower base.

This concludes the complete Method Cycle comprising reduction of an ore or waste feedstock to a hot gas mass that is divided by molecular weight into discrete parts and then recombined in proper proportion and with chemical and gas additions, when required, to produce a marketable product.

SUPPORTING DOCUMENTATION

Production Volume

At first it would be assumed that it would be impossible to provide coke production with this method in the volume required for charging steel furnaces and the like, but analysis of the procedure of this invention shows that a plurality of units like those proposed could indeed duplicate this volume and do so in a far more effective and efficient manner.

The Koppers-Becker Coking Apparatus has channels that are 20 feet high and some 50 feet in length. Each fourteen-inch wide channel is flanked by ovens on each side and usually there are banks of these in parallel groups of thirty-nine channels. Production is about 35 short tons per chamber per 15 hours of furnace time before discharge. Daily production in 24 hours is 55.7 short tons per chamber. There are down-time factors for repair and cleaning so this rounds off to some 50 short tons per chamber per day×39 that equals 1950 tons per day.

Assuming coke at 30 lbs. per cubic foot, production is approximately 58,500 cubic feet of coke per day.

The Method and System of this invention anticipates a continuous operation producing an extruded tube of coal for coking that has a 1¼ inch wall thickness with an outside diameter of 18 inches.

At one foot per second production speed this tube form of coke produced with this method produces 475 tons of coke per 24 hours—the time of the Kopper-Becker Equipment that produces 1,950 tons. Thus approximately four or five machines of the type of this invention would produce the equivalent or more than Kopper-Becker Equipment.

Purpose of the Invention

The broad purpose of this invention is to provide a process that can reduce an ore or waste material to a coke or carbon and to extract gases that can be reconstituted with other gases and chemicals in an ancillary process with generic apparatus to create a marketable product:

a. a more precise and variable system having a variety of procedures permitting the addition of gases and chemicals to waste materials normally considered unsuitable for reuse;

b. using this processing procedure as means to add gases and chemicals to coal as a base material for the production of new products;

c. use this series of process steps to reduce waste plastic material to a carbon and clean usable monomers without the use of the conventional refinery processing steps;

d. use this process procedure with certain electrical ancillary techniques to produce exotic forms of carbon as for example the Carbon 60 "Buckminster Balls";

e. make use of production means to produce clean and uncontaminated chemical and gas constituents extractable from any combustible material in an entirely enclosed system.

Coal Chemical Recovery Procedures

Compared with the Method of this Invention (The coal reduction processes are so well known that a comparison here will be helpful in understanding the procedures used in this process.)

Gas and Oil Vapors usually leave the coke container at temperatures of 1100 to 1300 degrees F. and are shock cooled by spraying with flushing liquor in progressive steps. (This "flushing liquor" was previously condensed in the mains and collected and recirculated. It amounts to 800 to 1200 gallons per ton of coal carbonized.) This step removes sensible heat from the gas and condenses some of the vapor and the light tars.

[In the I and II Processes of this invention this shock treatment of gas is done at the top of the unit by reintroducing the flushing or light ammonia liquor against the hot gas. External to the unit the stack gases and vapors are subjected to a like procedure for secondary recovery of light tars and a rework of the fume gases for molecular gas separation. In the III Process the gas temperature is kept high throughout the process.]

The remaining dead steam vapors and gases pass from collection points to cross-over mains and then to a suction main. A pressure-regulating valve is located in each cross-over main. After the gas and vapor pass these the temperature has dropped to 175 to 212 degrees F.

[In the I and II Processes of this invention the steam vapor from cooling coke is introduced to other fuels for heat. The gases from collection and cross-over mains are reintroduced into the MFC for ultimate Thermal Diffusion mole mass division.]

The liquid materials extracted from the gases fall through a downcomer to a flushing liquor decanter.

[The same is practiced in I and II Processes.]

Practice is to maintain a pressure differential between the cross-over mains and the collection main which is controlled by a pressure regulator. (These are uses for the low vacuum provided by the steam ejectors.)

[The same is practiced in I and II Processes.]

The flushing liquor decanter serves as the first point of tar collection and the gas scrubber as the second.

[The same is practiced in I and II Processes.]

The liquor overflows the decanter lip and the tar flows from the bottom into a raised pipe within a seal at the bottom that can be raised or lowered. The tar contains 2% to 5% water and usually can go to storage from the decanter for subsequent distillation. Liquors and tars flow from the scrubber to this decanter function as well.

[The liquor from the decanter is used as noted above for the shock spray in the MFC and is coolent for wash liquid in the stack gas scrubbing system prior to reintroduction of gases to the MFC.]

The remaining gas in the system must be cooled to about 90 degrees F. in a secondary operation so additional tar can be removed as well as more water vapor.

[In the I and II Processes of this method this fractioned gas would be cooled to temperature at about half that of the MFC and after division in the Thermal Diffusion and Electrostatic units, cooled, compressed, cooled again and bottled.]

[In the III Process gases would be passed through the Spectro-Cyclotronic System at the highest temperature possible.]

Two coolers follow in line, one the direct primary cooler and the the next the indirect primary cooler. In the first a cool liquor spray drops from the top of the tower over wood baffles as the gas rises from the bottom. This provides direct gas contact in a scrubbing action. Heat moves from the gas to the liquor to make a weak ammonia and water solution. In the indirect cooler heat exchanger, tubes over which this liquor flows, remove about 25% of the total tar and the remaining gas flows over more heat exchanger tubes to finally pass an electrostatic precipitator with a high potential between collection plates and many discharge points. The suspended particles are ionized and collect on the large plate surfaces to be periodically removed with automated wiping apparatus.

[In the I and II Processes of this invention the system described above is the desirable system for all surplus or stack gas before reintroduction to the MFC.]

Ammonia Liquor Treatment

1. Phenol is recovered from the ammonia liquor with use of a scrubber and solvent extraction process in which the ammonia liquor is dropped down through benzene which rises as it mixes with the ammonia liquor to collect the light oils and phenol which come to the top. The liquor ends at the bottom and passes to a dephenolized ammonia liquor storage tank.

2. The Phenolized Light Oil then passes to a caustic soda treatment process of three steps in which the caustic soda gradually absorbs the phenol and becomes sodium carbolate. After removal from the tower this chemical is boiled to remove moisture and solvent. It is then neutralized with carbon dioxide and the crude phenols and homologues are released. The caustic soda recovered is returned to the process.

3. The gas leaving the ammonia absorbers contains light oils with over a hundred constituents. It is a mixture of all the products of coal gas with boiling points ranging from 32 degrees F. to 390 degrees F.

4. There are olefin and diolefin hydrocarbons, some straight chain and cyclic paraffins, sulphur, nitrogen and oxygen compounds, all present in very small quantities. The principal stable constituents are benzene 60–85%, toluene 6–17% xylene 1–7% solvent naphtha 0.5–3%.

5. The light oil itself is approximately one percent of the total coal carbonized in this normal procedure.

The dense ammonia liquor produced with the I and II Processes of this method would be delivered to others for refining in the above manner.

The inventor proposes that Process III and its very high temperatures production of gases from a variety of materials can eliminated most of the processing steps now used in conventional systems while extracting the same constituents with greater economy.

GAS KINETIC THEORY

Molecules of gas even at rest are moving at high speeds and colliding. The impacts are perfectly elastic and there is apparently no loss of energy in such collisions.

It is also known that molecules of different gases do not diffuse together or mix easily.

Mixing apparently requires time, and with fast transport through a given vessel, little blending of different gases occur.

According to Boyle's Law gas at a constant pressure varies directly with density, or inversely with volume. Equal volumes of all gases at any given values of temperature and pressure contain an equal number of molecules.

It is evident that there must be a non-uniform distribution of velocities among all of the molecules in a given volume because of the constant occurrence of collisions.

The Maxwell-Boltmann Distribution Law shows that it is possible to determine the law according to which of the molecular velocities are distributed at any given temperature.

All suspensions of fine particles in gases or liquids exhibit "Brownian" motions. On the basis of the kinetic theory of gases Einstein in 1905 suggested that at least large molecules would be expected to behave in a like manner.

Chapman and Cowling showed conclusively that the viscosity of gases increased with temperature—just the opposite of what occurs in ordinary liquids. They also showed that molecules are centers of repulsive forces and are not like hard spheres.

M. Knudsen showed that molecules striking a hot surface not only increase translation, but also increase amounts of rotational and vibrational energy. [Translation: A function changing the coordinates of a point in euclidean space into new coordinates relative to axes parallel to the original.]

T. L. Ibbs described Thermal Diffusion as follows:

If a temperature gradient is applied to a mixture of two gases of uniform concentration there is a tendency for the heavier or large molecules to move to the cold side and the smaller molecules to move to the hot side. The amount of thermal separation thus produced by a given difference in temperature depends upon the proportion by volume of heavier gas and the lighter gas. The separation is also influenced by the field of force operating between the unlike molecules.

In an experimental chamber devised by Clusius and Dickel this was shown to occur with heavier gases collecting at the bottom and lighter at the top.

[In this experiment an electric current provided the heat and of course this was surrounded by an electric and magnetic field (a "field of force") which seems to have been ignored. Therefore the inventor of this method believes that the introduction of an adjustable electrical potential of 500 and 2500 volts D.C. −/+ difference between the hot and cold surfaces in the ancillary Thermal Diffusion chambers is essential to effective performance. Secondly to accelerate the expelling of gases from the separation chamber the use of a cathode type eletrostatic configuration in each exiting port can speed this separation and improve performance.]

Partially based on the foregoing and without violation of any physical laws, the inventor believes that a mix of very hot gases as produced in this apparatus will move with high velocity along such "mean free paths" as may exist between the molecules. This path depends upon diameter, viscosity, heat conductivity and the diffusion of the gases.

The apparatus of this invention has been designed to take advantage of the Thermal Diffusion functions and the effects of centrifigul forces, and uniform magnetic field on ionized molecules directed into such a field.

In addition the "elastic" molecular character, the "translation" and "mean free path" features tend in the inventor's mind to support one of the selection methods of this invention in which molecules are diffusely directed into a parabola bowl from its focal point so they "bounce" back in straight "mean free paths" to strike a 45-degree plane and "bounce" again. In the new trajectory that the inventor believes varies in proportion to the mass of the projectile's translational deflection, the molecules can then be captured in a properly arranged stack of finite slits thus providing a division means based on mass. Dependence here is based on the mass dominance of the large molecules over those of lesser mass.

In the III Process the extracted gas is at such high temperatures, 1,200 to 2,000 degrees F., that any gas in the mix is well above vapor pressure considerations. As these are introduced to ionization, collimation and the Spectro-Cyclotronic separation chamber, gas flow temperatures and pressure controls are critically maintained. During approach to the chamber the gas is mass bombarded with electrons from a renewable cathode of moving aluminum wire and a "getter" function using Zirconium.

The Zirconium is intermittently sputtered on the aluminum wire in thin layers. In this way the Aluminum provides electron emission and the Zirconium spots act as the getter to absorb oxygen and nitrogen for prevention of water formation that would neutralize the gases and prevent classification.

In the IV Process the gases are recombined to create a product. In some cases outside gases and chemicals are added in the make-up of such products.

While coal is only one of many candidates for reduction in this process, its performance under heat treating conditions is so well-known and documented that it has been used throughout this application for comparison purposes.

Anticipated Coke and Gas Production Performance

| Based on these Coal Characteristics | |
|---|---|
| Moisture Content | 9.6 percent |
| Volatile Matter Content | 17.8 percent |
| Ash Content | 7.5 percent |
| Operation Time | |
| Ingress to Eject | 1 minutes |
| Coking Time | 1minutes |
| Center Temperature | 2,800 degrees |
| Retention Tube Temperature | 2,400 degrees |
| Coke Oven Gases Produced | |
| These vary with coal quality. | |
| *$CO_2$ Volume | 1.3–2.4 |
| $O_2$ Volume | 0.2–0.9 |
| $N_2$ Volume | 2.0–9.6 |
| CO Volume | 4.5–6.9 |
| $H_2$ Volume | 46.5–57.9 |
| $CH_4$ Volume | 26.7–32.1 |
| Illuminants | 3.1–4.0 |
| Coke Characteristics as Produced. | |
| Moisture Content | 1.7 percent |
| Volatile Matter Content | 1.2 percent |

*Includes $H_2S$

The gases separated with this method and system will be determined by analysis using GLC or Gas Chromatography. The gas from each separation level will be reduced to a temperature below 400 degrees C. and subjected to an Absorption Column analysis that produces a chart that shows the prime constituent and secondary impurities.

Within the space of the MFC in the I and II process as well as the MGC of the III process there will inevitably be layers or stratas of gas molecules that are attracted or repelled by barriers of varied temperature. There are collisions or repulsion as large and small molecules approach one another. As viscosity increases the mean free paths must shorten. An analogy to a fluid bed of particles might be considered in which their vibration creates a separation of particles by size.

The functions at work here are some of the most complex of chemical reactions and in a mass of mixed gases the collisions, repulsion and attraction of molecules one to another create chaos. The weaker forces at work are the Van der Waal forces. Collectively the dipole, dipole forces, Hydrogen bonding and London Forces. These are the reason for the use of the Thermal Diffusion and Electrostatic/Magnetic means in the final separation of molecules.

It would seem logical that the sweep of the rotating center member of the MFC and MGC chambers would move the molecules in a circular path turning upon itself in a helical plane augmented by the jets. As they are swept around the torus space of the chamber, the centrifical force in this motion will tend to move the heavier and larger molecules toward the outside wall. This wall has a cooler surface than that of the retention tube at the center so, based on the Thermal Diffusion theory, the heavier molecules are attracted to it. The lighter molecules attract to the hot center and gradually rise to the top of the chamber. Annular collars extend a few inches inwardly from the outer wall at midpoints between each level of an escape port to help create a boundary for strata formation of varied molecular size selection ranging from the light and small at the top to the heaviest at the bottom.

Concave cups are located at the end of each tube extention on gas escape valves. The convex side faces upstream to the sweep of gases as driven by the jets.

These cups create eddie currents in the concave space and create a dwell at the tube opening. As the valve is opened this gas is drawn into an expansion chamber of lower pressure and moves beyond to the secondary Thermal Diffusion and Electrostatic Accelerating separation units outside the MFC Processes I and II.

In the Process III the refinement described above is not used and the effort is to heat the feedstock to the highest temperature possible within an evacuated space so every constituent is reduced to carbon or a gas. The gas is exhausted to a cleaning function. It can be subjected to Thermal Diffusion Separation as in Processes I and II, but this seems redundant. In the Process III the traveling gas mass is ionized and driven against a parabola to reverse its direction 180 degrees. This parabola is part of an expansion chamber in which the gases are subjected to a centrifugal force as they are deflected. All of these effects, expansion, deflection and path alteration tend to separate the gas mass into gross molecular weight classes. This is a preliminary step for the introduction of horizontal plane division of these gas collections so they can These cups create eddie currents in the concave space and create a dwell at the tube opening. As the valve is opened this gas is drawn into an expansion chamber of lower pressure and moves beyond to the secondary Thermal Diffusion and Electrostatic Accelerating separation units outside the MFC Processes I and II.

In the Process III the refinement described above is not used and the effort is to heat the feedstock to the highest temperature possible within an evacuated space so every constituent is reduced to carbon or a gas. The gas is exhausted to a cleaning function. It can be subjected to Thermal Diffusion Separation as in Processes I and II, but this seems redundant. In the Process III the traveling gas mass is ionized and driven against a parabola to reverse its direction 180 degrees. This parabola is part of an expansion chamber in which the gases are subjected to a centrifugal force as they are deflected. All of these effects, expansion, deflection and path alteration tend to separate the gas mass into gross molecular weight classes. This is a preliminary step for the introduction of horizontal plane division of these gas collections so they can be delivered directly into the magnetic field of the cyclotron in that form. Here they are divided into a possible 38 divisions.

Finally after all the reduction and gas separation, the IV Process does the work of assembling the many gas fractions produced in the III Process while they are still hot and well above vapor pressures.

A marketable product is created from the reduction, fractioning, mole mass division, disassociation and finally reassembly as a new kind of gas combination.

The apparatus involved in the IV Process has been described earlier. Gases are combined at the extrusion nozzle within an inert media. It is stirred in the column between the Retention Tube and a new static internal Supporting Tube that applies intense cold to the mix so the temperature drops quickly.

Before the gas mix has reached the perforation level of the Retention Tube it becomes a liquid that is collected in an enclosing evacuated chamber designated Final Collection Chamber or FCC not unlike the MFC and MGC of the Processes I, II and III except in this case cold is being retained rather than heat.

Control of metering or a form of titration to deliver gases and chemicals to the nozzle is the critical factor in the success of this IV Process. The environmental controls for heat and cold, as well as rotation speeds, are relatively simple to achieve.

It is graphically apparent that there are dozens of apparatus variations generic to this method that will be developed by this inventor and others skilled in the art. For example the height of the unit will vary as will the diameter of the tube feedstock produced. Fractioning points will differ with feedstock as will adjustments of. temperatures, flow rates, pressures as well as electrical voltages and magnetic gauss levels.

Shape and form will change with experimentation, particularly in the area of the Thermal Diffusion and Electrostatic Magnetic Apparatus. Temperature ranges will require different heating procedures and fuels. Improvements in circulatory methods, valving and controls will create new apparatuses as well.

OBJECTS OF THE INVENTION

Methods

An object of this invention is to provide a method comprising a rotating dual extruder delivering a tubular feedstock extrusion, with means for vacuuming and gas port injection, to a rotating perforated tube extrusion receiver, a center-fire recirculated inside the extruded feedstock tube, with an ablation protective fire interface glaze lamination, an evacuated enclosing chamber to receive product driven through the receiver tubes perforations and with liquor and gas collection means, in a reduction process for ores to produce a solid residue and extract usable liquors and gases.

An object of this invention is to provide a method comprising a rotating dual extruder delivering a tubular feedstock extrusion, with means for vacuuming and gas port injection, to a rotating perforated tube extrusion receiver, a center-fire recirculated inside the extruded feedstock tube, with an ablation protective fire interface glaze feedstock lamination, an evacuated enclosing chamber to receive product driven through the receiver tubes perforations and with liquor and gas collection means, in a reduction process for waste plastics to produce a solid residue and extract usable liquors and gases.

An object of this invention is to provide a method comprising a rotating dual extruder delivering a tubular feedstock extrusion, with means for vacuuming and gas port injection, to a rotating perforated tube extrusion receiver, a center-fire recirculated inside the extruded feedstock tube, with an ablation protective fire interface glaze feedstock lamination, an evacuated enclosing chamber to receive product driven through the receiver tubes perforations and with liquor and gas collection means, in a reduction process for pulverized rubber to produce a solid residue and extract usable liquors and gases.

An object of this invention is to provide a method comprising a rotating dual extruder delivering a tubular feedstock extrusion, with means for vacuuming and gas port injection, to a rotating perforated tube extrusion receiver, a center-fire recirculated inside the extruded feedstock tube, with an ablation protective fire interface glaze feedstock lamination, an evacuated enclosing chamber to receive product driven through the receiver tubes perforations and with liquor and gas collection means, in a reduction process for any combustible material and to produce a solid residue and extract usable liquors and gases.

An object of this invention is to provide a method comprising a stationary dual extruder delivering a tubular feedstock extrusion, with means for vacuuming and gas port injection, to a rotating perforated tube extrusion receiver, a center-fire recirculated inside the extruded feedstock tube, with ablation protective fire interface glaze feedstock lamination, an evacuated enclosing chamber to receive product driven through the receiver tubes perforations and with liquor and gas collection means, in a reduction process for any combustible material to produce a solid residue and extract usable liquors and gases.

An object of this invention is to provide a method to produce hot gases with a circulatory and regenerative fire system contained in the center of an extruded feedstock tube, the heat of which drives gases and liquors from the feedstock through the perforations of an enclosing cooler tube that in turn is enclosed by a tall, previously air-evacuated vessel, in which said gas varieties mix and roughly seek strata levels by molecular weight so fractions can be vented from the vessel into conventional gas and liquor refining procedures common to the art.

An object of this invention is to provide a method to produce hot gases with a circulatory and regenerative fire system contained in the center of an extruded feedstock tube, the heat of which drives gases and liquors from the feedstock through the perforations of an enclosing cooler tube that in turn is enclosed by a tall, previously air-evacuated vessel, in which said gas varieties mix and roughly seek strata levels by molecular weight so fractions can be vented from the vessel at different levels into thermal diffusion and or electrostatic and magnetic mass/weight molecular division systems.

An object of this invention is to provide a method to produce hot gases with a ramjet driven high velocity circulatory and regenerative fire system partially contained within the center of an extruded feedstock tube, the heat of which drives gases and liquors from the feedstock through the perforations of an enclosing cooler tube that in turn is enclosed by a tall, previously air-evacuated vessel, in which said gas varieties accumulate with increasing pressure to be released to a dry cleaning system followed by Thermal Diffusion, Ionization Electron Bombbardment, Centrifugal Force and Parabola Deflection Separation, Electrostatic and Magnetic mass/weight molecular division and finally, after division, reintroduction proportionately to an extruded media with churning and cooling means for liquidification of the combined gases in the creation of a chemical product.

An object of this invention is to provide a method comprising means with a stationary extruder to press a single tubular media extrusion through an extruder nozzle, with vacuuming and hot gas injection means in the nozzle, into and between surfaces of a dimpled rotating tube, which has a distant end perforated, and the corrugated surface of a stationary support tube telescoped within the said first tube so the torus space between these retains the media and hot injected gases as they are mixed by shear dynamics between the tubes' rotating surfaces while liquid nitrogen inside the corrugated tube cools the media gases, so their condensing liquids accumulate and pass through final perforations of the receiver tube as a product of the mixed chemical and gas combination after which the media is cleaned and recirculated as is the liquid nitrogen or other cooling agent.

It is an object of this invention to provide a fire regeneration method in which the extrusion receiver for the feedstock is a long perforated rotating tube, the ends of which are rotary sealed in a stationary vessel of lesser length, that is evacuated and to introduce at the extrusion nozzle bottom end, inside the feedstock extrusion center, a burnable producer gas, natural gas, air and oxygen mix which is ignited to burn along its entire height with intermittent stimulation using oxygen insertion to bring to incandescence, a holed ceramic heat sink radiator hanging in the tube center. The fire thus generated is drawn off at the top of the feedstock tube to be driven down for reentry at the extruder nozzle providing all the heat required for the process internally and externally of the containing vessel.

Extruder Objects

An object of the invention is to provide apparatus to extrude a feedstock in tubular form from pulverized ore or combustible material for use as a reduction process feedstock.

An object of the invention is to provide means to simultaneously extrude a second differing material of a high temperature meltable material as a tubular shape to telescope-fit within the feedstock tube.

Another object of this invention is to employ extrusion means in which a plurality of materials are extruded as a laminated tube through a common nozzle simultaneously as fed for subjection to a heat reduction process.

Another object of this invention is to employ extrusion means in which a plurality of materials are extruded over streamlined piping that admits gases and heat to the center of a laminated tube moving through a common nozzle simultaneously and delivered as fed for subjection to a heat reduction process.

Another object of this invention is to employ extrusion means in which a plurality of materials are extruded in tubular form through a common nozzle followed by vacuum means to exhaust air from the material as fed for subjection to a heat reduction process.

Another object of this invention is to employ extrusion means in which a plurality of materials are extruded in tubular form through a common nozzle followed with means within the same nozzle to vacuum the feedstock and means to inject chemicals and gases into the fed material prior to delivery to a heat reduction process.

An object of this invention is to employ extrusion means in which a single material is extruded through a nozzle in tubular form followed with means in the same nozzle to vacuum the fed material and other means to inject chemicals and hot gases through porting in the nozzle and into the material as a feed for a cold gas liquefying process.

It is an object of this invention to employ stationary extrusion means as apparatus to drive a tubular feedstock through a rotating hot reduction process.

It is an object of this invention to employ stationary extrusion means as apparatus to drive a tubular material through a rotating cold liquefying process.

It is another object of this invention to employ rotating extrusion means as apparatus to drive a tubular feedstock through a varied speed rotating hot reduction process.

It is an object of this invention to employ a varied rotating extrusion means as apparatus to drive a tubular feedstock through a varied rotating speed hot reduction process.

It is an object of this invention to employ a plurality of rotational speed zones in an extrusion nozzle as apparatus to drive a tubular feedstock through a rotating hot reduction process.

It is an object of this invention to employ a plurality of rotational speed zones in an extrusion nozzle as apparatus to drive a tubular feedstock through a rotating cold liquefying process.

It is an object of this invention to employ a two speed zone rotating extrusion means as apparatus to drive a finely divided media formed as a tube and used as a chemical and hot gas carrier through a cold gas liquefying process with differing rotational speeds.

It is an object of this invention to employ a stationary extrusion nozzle with a rotating nozzle extension zone in which shallow helical serrations guide the feedstock or media admission into the torus space between the higher speed surface of the perforated receiver tube and the cold stationary corrugated support tube containing liquid nitrogen.

Retention Tube and Enclosing Vessel

It is an object of this invention to use centrifugal force to accelerate the removal of liquors, tars and gases and a tubular body of feedstock passing through a rotating and perforated retention tube.

It is an object of the invention to mount a rotatible heating tube apparatus on a vertical axis.

It is an object of the invention to provide a perforated or slotted-Nickel-Titanium metal, a ceramic or Alumina or other high-temperature resistant tube material for retention of the tubular feedstock in passage through the process of heat reduction.

It is an object of this invention to use as a feedstock extrusion receiver a long perforated retention tube into which a feedstock is closely telescoped.

It is an object of this invention to use as a feedstock extrusion receiver a long perforated rotating retention tube into which a feedstock is closely telescoped.

It is an object of this invention to use as a feedstock extrusion receiver a long perforated rotating retention tube, the ends of which are rotary sealed in a stationary vessel of lesser height that is evacuated.

It is an object of this invention to use a retention tube extrusion receiver that is a long perforated and rotating tube, the ends of which are rotary sealed in a stationary vessel of lesser height that is evacuated, but with ends extending far enough beyond the stationary vessel to receive the extrusion feedstock at one end and expel it at the opposite end with each end outside the evacuated space.

Main Gas Chambers and Hot Gas Handling

It is an object of the invention to totally enclose this process and its heat within a sealed insulated and evacuated chamber that eliminates the escape of gases.

It is an object of this invention that equipment ancillary to this chamber as conveyors of residue dispoal units be enclosed with means to recover producer gases generated with the cooling of these products.

It is an object of this invention to provide a system for the recirculation of gases and/or liquors continuously to achieve maximum liquor density and a dense gas volume by repeated treatment.

It is an object of the invention that the gas chamber or extrusion retention tube receiver enclosure be pressure-pulsed at short intervals as individual valves are opened and closed to relieve pressure in the chamber and deliver gas to prime receivers outside the chamber.

It is an object of the invention that shaped cup-like devices on the ends of gas exhaust pipe be held inboard from the chamber walls to receive eddie current gas dwells that these cups create and to thus avoid the condensing liquor gases on the chamber walls.

It is another object of the invention that there be an air-cooled lower pressure gas receiver to provide a slightly cooler chamber at the end of the said exhaust pipes so gases will flow easily to these spaces as valves are opened.

Gas Cleaning System

It is an object of this invention to maintain gas ambient heat and purity with a dry cleaning process using small hollow and holed titanium balls that the particulate laden hot gas is driven through to leave the particulate on the multi-surfaces of the balls that are then circulated through an "air-knife" cleaning procedure using carbon dioxide as the "air" after which the balls are returned to the tank for gas cleaning and another "air-knife" cycle.

It is an object of the dry cleaning process to use vibration equipment and gravity to shake down the accumulated particulate and compress it for subsequent water cooling and gas delivery to stack gas recovery.

It is an object of the dry cleaning process to use a plurality of balls in the preferred size of 1" diameter and 0.020" to 0.045" wall thickness and with fourteen maximum size holes in the shell of each ball.

Fire and Heat Equipment

It is the object of this invention to accelerate heat treatment by reducing the volume of feedstock treated to thin layers passing the heat source in direct contact.

It is the object of this invention to accelerate heat treatment by reducing the volume of feedstock treated to thin layers passing the heat source in direct contact at a speed of one foot per second with heats as high as 2,800 degrees F.

It is an object of this invention to continuously recirculate hot gas and flame at high velocities to make maximum use of fuel and the maximum application of heat.

It is the object of this invention to accelerate heat treatment by enclosing a direct fire within a tube of moving feedstock so a maximum amount of heat is transferred into its body.

It is an object of this invention to virtually eliminate the massive ceramic work and metal structures associated with normal coking operations.

It is an object of this invention to provide a form of insulation to protect the inner tube face of the feedstock from ablation in the direct heat by use of a conductive "glaze" using a high temperature fusing material for this purpose.

It is an object of this invention to provide a form of insulation to protect the inner tube face of the feedstock from ablation in the direct heat by use of silica and clay that would melt and fuse into the feedstock at temperatures of 2,000 degrees F.

It is an object of the invention to use Ramjet engines to power the high velocity heat drive regeneration system and to untilize the reciprocating thrust of these for the production of hydraulic power delivered to a hydraulic accumulator for powering ancillary equipment.

It is an object of this invention to recirculate heat in its return path from the source through the gas chamber and within angularly placed vanes set at 15 degrees off the perpendicular to the conductive pipe line so gas tends to rise across these planes as it is superheated in this chamber's limited space to increase its velocity.

It is an object of this invention to use a form of "spool-checker" or holed ceramic fire brick in the fire center as an incandescent radiator created by oxygen injection to the fire within these at progressive height intervals.

It is an object of this invention to make "producer gas" or "water-gas" from the water cooling functions associated with coke or carbon residue for the augmentation of the natural gas fuels used in the process and to recover this cooling water with condensing systems for reuse.

It is an object of the invention to use long double wound pipe coils in the stack gas piping in which very high temperature and pressure flash steam is generated for driving the vacuum creating injectors used for heating and cooling functions.

Thermal Diffusion

It is an object of this invention that a dual chamber be used in which the inner chamber is cool and the outer hot so exhausted gases from the main gas chamber are attracted to these respective surfaces based on molecular weight and then expelled.

It is an object of this invention that this dual chamber be fitted with cathode-type accelerators to move the gas out of the chamber spaces as well as direct current voltage in this space to help in the attraction and separation into heavy and light molecular weights.

Spectro-Cyclotronic System

It is an object of this invention to control the flow of gas from the generation system and main gas chamber with an automatic laminar flow control system preceeding the subsequent processing.

It is an object of the invention to deliver a controlled gas flow to a pipe path that passes a very large electrically charged cathode suited to the ionization of the gas mass by bombardment with a storm of 25,000 electron volt power.

It is an object of the invention to provide a renewable cathode device in which a fine aluminum wire is continuously wound and unwound from a conical reel so new wire is exposed to the immediately adjacent gas flow with means to move the wire in and out of the presence of a carbon dioxide gas pressurized and cooled mechanism chamber that isolates this equipment from the gas passage.

It is another object of this invention that the aluminum wire of this renewable cathode be intermittently coated with sputtered spots of Zirconium which serves as an Oxygen and Nitrogen "getter" in the hot gas atmosphere so subsequent processing is not inhibited by water formation.

It is a further object of this invention that the wire exits and enters the mechanism chamber via a tightly wound coil spring, the I.D. of which just fits the aluminum wire. This is held in a fitting that is tight on the O.D. of the spring form so a tortuous path or gas leak seal is provided through which the wire can pass with minimum pressure gas loss.

It is a further object of this invention that hot ionized gases be projected down perpendicularly from a focal point spraying nozzle into a deep parabola.

It is another object of this invention that a 45-degree inverted conical plane receive the molecular rebound from the said parabola surface.

It is an object of this invention that the gas subjected to this parabola deflection be within a space moving in a circular path at speeds to provide a centrifugal biasing force to the molecules as they are deflected from the said parabola.

It is another object of this invention that the molecules of these trajectories which are moved by their heat engendered momentum, deflected by the parabola into a new trajectory and with curvature of their mean-free-path bent, be caused as a function of mass to fall into stationary horizontal openings surrounding the rotating armature enclosing this expanding gas mass.

It is another object of this invention that the gas divided in the said parabola/centrifugal force system, be individually delivered from this said environment in combined narrowly rectangular passages that end together in a horizontal stack of openings at the tube end held within the magnetic field of the cyclotron.

It is a further object of the invention that the gas after ionization be driven through a plurality of collimating slots and into the edge of a uniform magnetic field, perpendicular to the direction of gas flow, where the gas molecules turn in a family of curves in cyclotronic response to the magnetic field's influence to fall-out based on molecular weight to individual vertical slits in a circular pattern in the wall of the cyclotron unit, which slits are exactly the height of the magnetic pole spacing.

It is an object of this invention that the boundaries or side edges of the molecular receiver openings within the said cyclotron be razor-like in thinness.

It is another object of the invention that each slip opening have at its opposite end an opening into a manifold.

It is another object of the invention that each manifold opening from a respective slit be stopped on each side, within the manifold, by a valve so it can be isolated from the adjoining slip openings, or conversely can be opened so two or a plurality of slit openings can be used together when for example one gas separation has a spectral width greater than one slit opening.

It is a further object of the invention that each slit opening and its pipet end in a third valve expressly for that opening which permits the individual delivery of gas from that one pipet or a group using the manifold valving.

It is a further object of the invention that there be at least thirty-five slits around the periphery of this cyclotron for gas reception.

It is a object of the invention that one thermal diffusion unit like that described earlier and two spectro-cyclotronic units be used together for optimum recovery of gases using the former for a rough light and heavy gas division and the latter to separate as many as seventy possible divisions from these two mass selections.

Storage

It is an object of the invention that gases separated be reduced to vapor pressure levels by passage through coils in tanks with brine or liquid nitrogen for shock cooling and then compressed for tankage in suitable pressure tanks that are cooled to remove the compression heat.

Recombination

It is an object of the invention to use a Gas Chromatograph analysis of each individual gas separated and divided for a determination of proportional and titrational combining potential so these can be delivered as produced and while still at high temperatures into a churning media that mixes the combination which is cooled, condensed and recovered with features like those in the make-up of the orginal feedstock.

It is an object of the invention that extrusion apparatus be used with the perforated extrusion receiver tube and a telescoped corrugated cooling tube inside this to provide a space with mixing means for a media extrusion into which gases for recombining are injected, cooled, condensed and recovered as a liquid product.

It is an object of this invention that the shear induced in the rotation of the perforated extrusion receiving tube and the corrugated support tube function as a mixing operation because the helical dimple pattern of "bumps" on the inside of the unperforated or lower portion of the perforated tube works the media against the vertical corrugations of the supporting tube to combine the gases trapped in the interstices of this material.

It is a further object of this invention that liquid Nitrogen be passed through the extruder nozzle center and through the corrugated support tube which interfaces the media and drives the heat into the opposite perforated tube wall which has cooling coils on or near its outside surface.

It is a further object of the invention that a cold gas of any type be used for cooling said corrugated center e ber.

It is a further object of this invention that a liquid coolant of any suitable type be used in the corrugated member of the said gas recombining functions.

BRIEF DESCRIPTION OF THE DRAWINGS

FIG. 4 is a cross-sectional view of the rotating extruder of FIG. 3 showing ancillary servicing apparatus.

FIG. 5 is a plane view of a Steam Ejector for vacuum evacuation of the feedstock media.

FIG. 6 is a plane view of an air compressor source for compressed air of the ignition system.

FIG. 7 is a plane view of Carbon Dioxide gas source for bearing temperature control.

FIG. 8 is a plane view of an oxygen source for the ignition system.

FIG. 9 is a shematic and cross-sectional view of the embodiment of this invention comprising the Main Gas Chamber, Producer's Gas production and recirculation of Liquors into the hot gas stream derived from the perforations enclosing the feedstock media and Firetube.

FIG. 10 is a schematic illustration of the central Ceramic Radiator in the Firetube showing gas extraction through perforations of the Rotating Feedstock Media Support Tube and the expelling of gas and carbon residue at the top.

FIG. 11 is a plane view illustration of a gas egress port Extension Tube inside the Main Gas Chamber drawing gas from the eddie current dwell at its end.

FIG. 12 comprises side and plane view illustrations of the apparatus for gas eddie creation at the extremity of the Extension Tube of FIG. 11.

FIG. 13 is a cross-sectional view of the Primary Gas Receiver and the Thermal Diffusion Gas separation apparatus and internal Electrostatic Accelerators.

FIG. 14 is a schematic of a simple commutator to switch current to individual gas egress port valves in pulsing sequence.

FIG. 24 is a plane view of the preferred form of the Sphere.

FIG. 25 is a plane view of a Vibratory Disc of FIG. 23 that sifts gas particulate.

FIG. 26 is a three-dimensional view of the shaped compression Slit Orifice Apparatus through which pressured gas is driven to remove particulate from the Spheres in passage.

FIG. 27 is a schematic view of a Gas Laminar Flow-control Apparatus shown as an unclaimed vital system function.

FIG. 28 is a schematic illustration of a Gas Separation System comprising the magnetic field of a Cyclotron.

FIG. 29 is a schematic view of two of a plurality of tank receivers for hot separated gas that comprise cooling apparatus, gas compressors and cooled receiver tanks enclosed in steam-purgeable vessels for safety.

FIG. 30 is a schematic illustration like that of FIG. 28 but shown here with details; of FIG. 31 showing a three-dimensional view of the iron structure of the Cyclotron and its Pole Pieces and FIG. 32 which is a cross-sectional view of the Cyclotron Magnet and its uniform field lines of force.

FIG. 33 is a schematic top view of the Cyclotron of FIG. 28 showing the Gas Dividing Slit Orifices, piping, valve manifold and gas introduction to the magnetic field.

FIG. 34 is a schematic view of the valves and manifold on the periphery of the Cyclotron.

FIG. 35 is a three-dimensional view of the effect of the magnetic field upon the gas molecules.

FIG. 39 is a three-dimensional view of the magnet structure of FIG. 28 as associated with;

FIG. 52 is a cross-sectional schematic of a nozzle like that of FIG. 50 in which coolant flows to convert to liquid the hot gases introduced at the nozzle through a plurality of pipes converging from the Centrifugal Parabola and Cyclotron Molecular Separation Apparatus.

FIG. 53 is a schematic illustration of the essential Flow Control apparatus and a cross-sectional view of the Molecular Separation System.

FIG. 60 is a cross-sectional schematic of the cold gas recovery process embodiment of this invention in which hot gas proportions convert to liquid in a cold churning media after which the media is cleaned and recirculated.

FIG. 61 is a three-dimensional view in cut-away of the tube forms that provide the mixing action of the gas-containing media.

FIG. 62 is a schematic assembly of the apparatus of this invention in which Fire Reduction produces hot gases that are cleaned after liquors and tars are removed.

FIG. 63 is a schematic view of gas laminar flow control apparatus.

FIG. 64 is a schematic view of the Cyclotron.

FIG. 65 is the gas cooling and storage.

FIG. 66 is like that of FIG. 62 but shown here with;

FIG. 67 which is a schematic illustration in combination of the gas laminar flow apparatus together with the Centrifuge/Parabola apparatus followed by;

FIG. 68, the Cyclotron in cross-section and

FIG. 69, the top schematic view of the Cyclotron and pipette division for gas molecular separation.

DETAILED DESCRIPTION OF DRAWINGS

Preface

The four generic forms of this invention, designated as Methods I, II, III, and IV, are shown in schematic illustrations in FIGS. 1, 2, 3, 15, 52 and 56 so the differences and similarities can be understood.

The Systems that Comprise Method I

Figure 1:
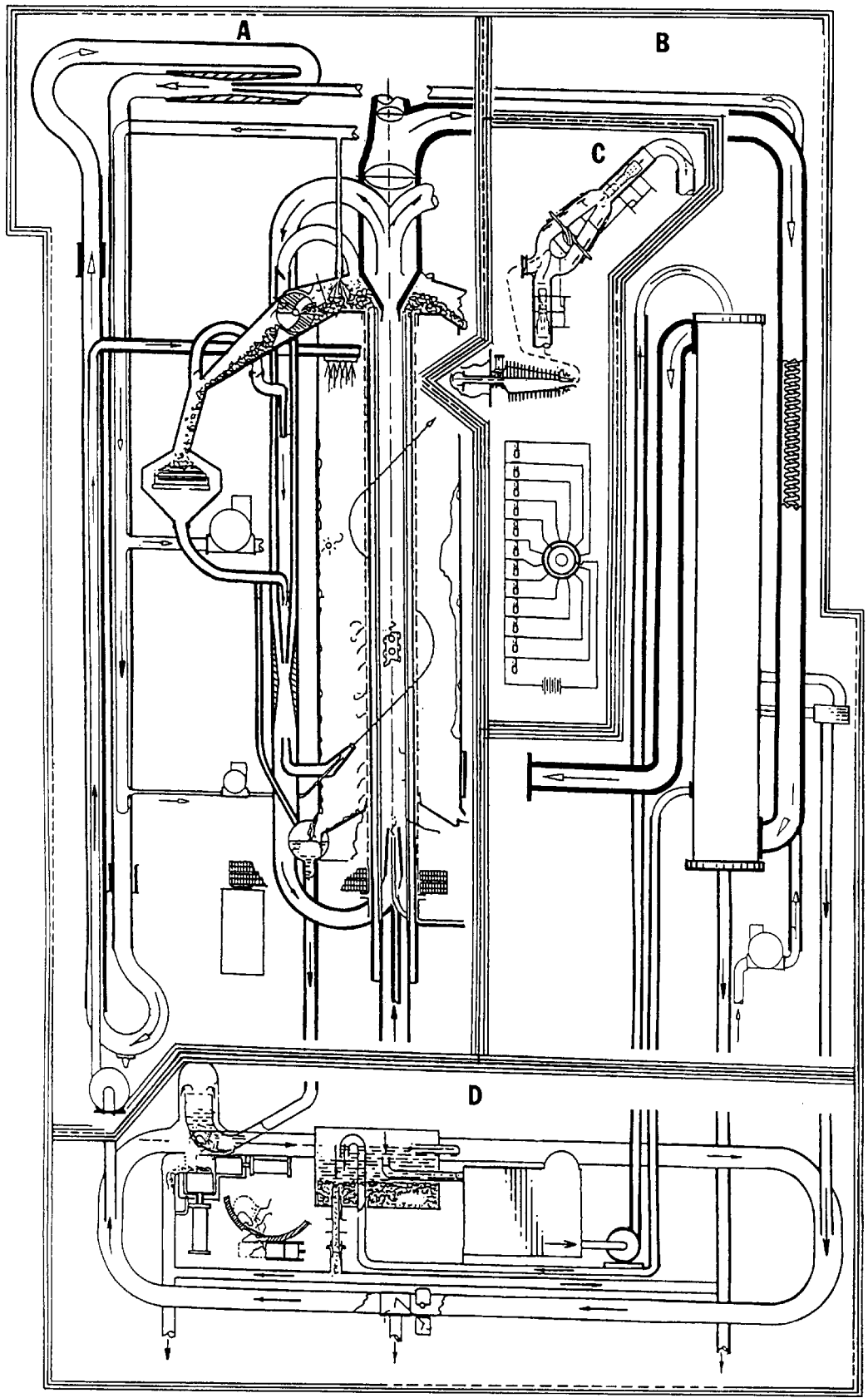
FIG. 1 is a schematic view of the embodiment of a coal reduction process.

FIG. 1 is divided into parts;

"A" representing the nucleus of the Method comprising the Extrusion Heat Treatment System, the Retention Tube Assembly, Gas Generation System, Carbon Collection System and Water-Gas Generation means;

"B" the Stack Gas Fume Scrubber System;

"C" representing the Gas Treatment System; and

"D" the Tar and Liquor Collection of conventional design.

Figure 2:
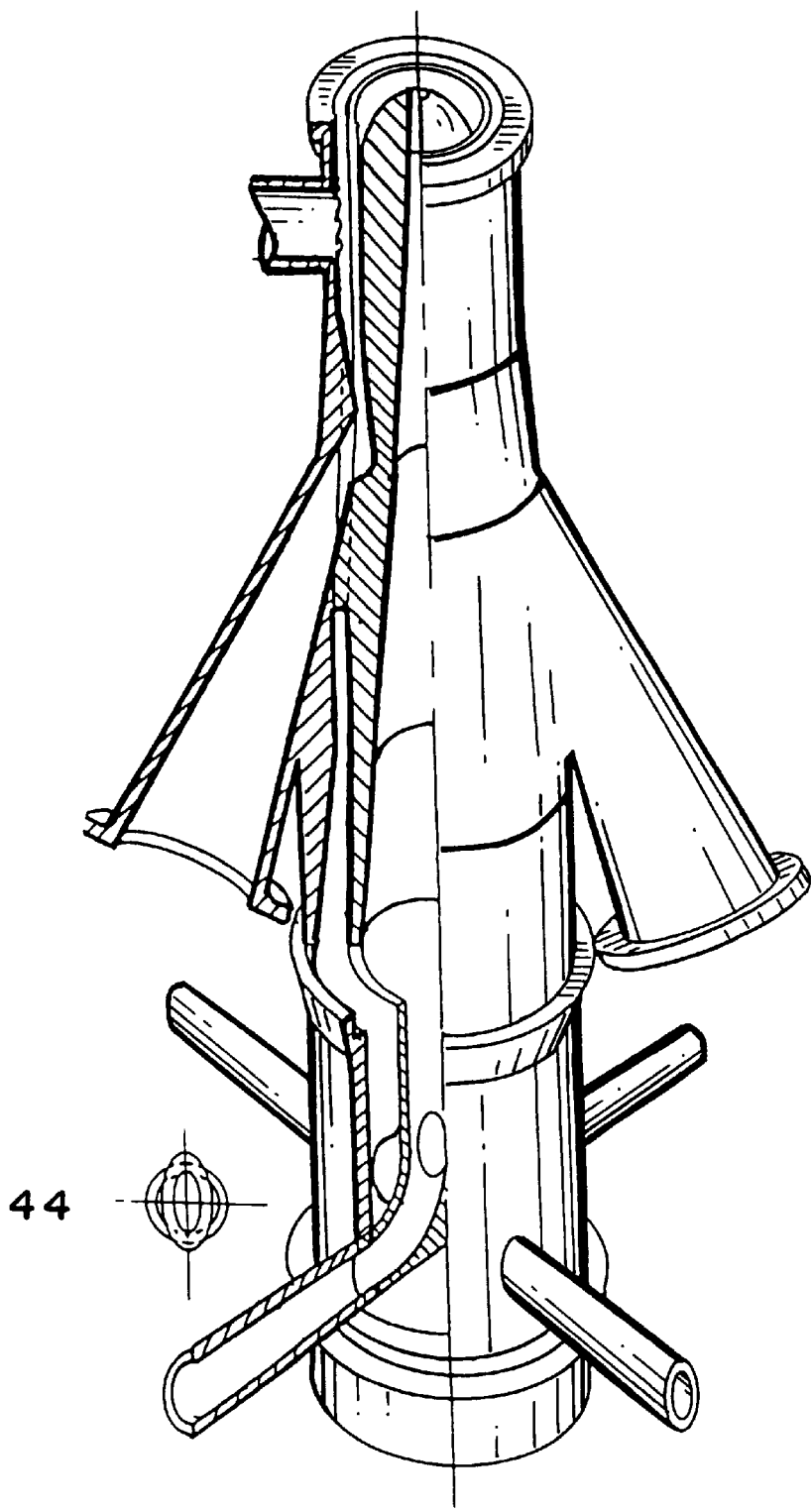
FIG. 2 is a cross-sectional perspective view of a static extruder nozzle of this invention.

FIG. 2 shows a three-dimensional drawing of a static extruder nozzle configuration and the associated inset a cross-section of the streamlining of the piping (44) over which the moving mass of extrusion material passes. This is the extrusion nozzle system of Methods I, II and III.

Figure 3A:
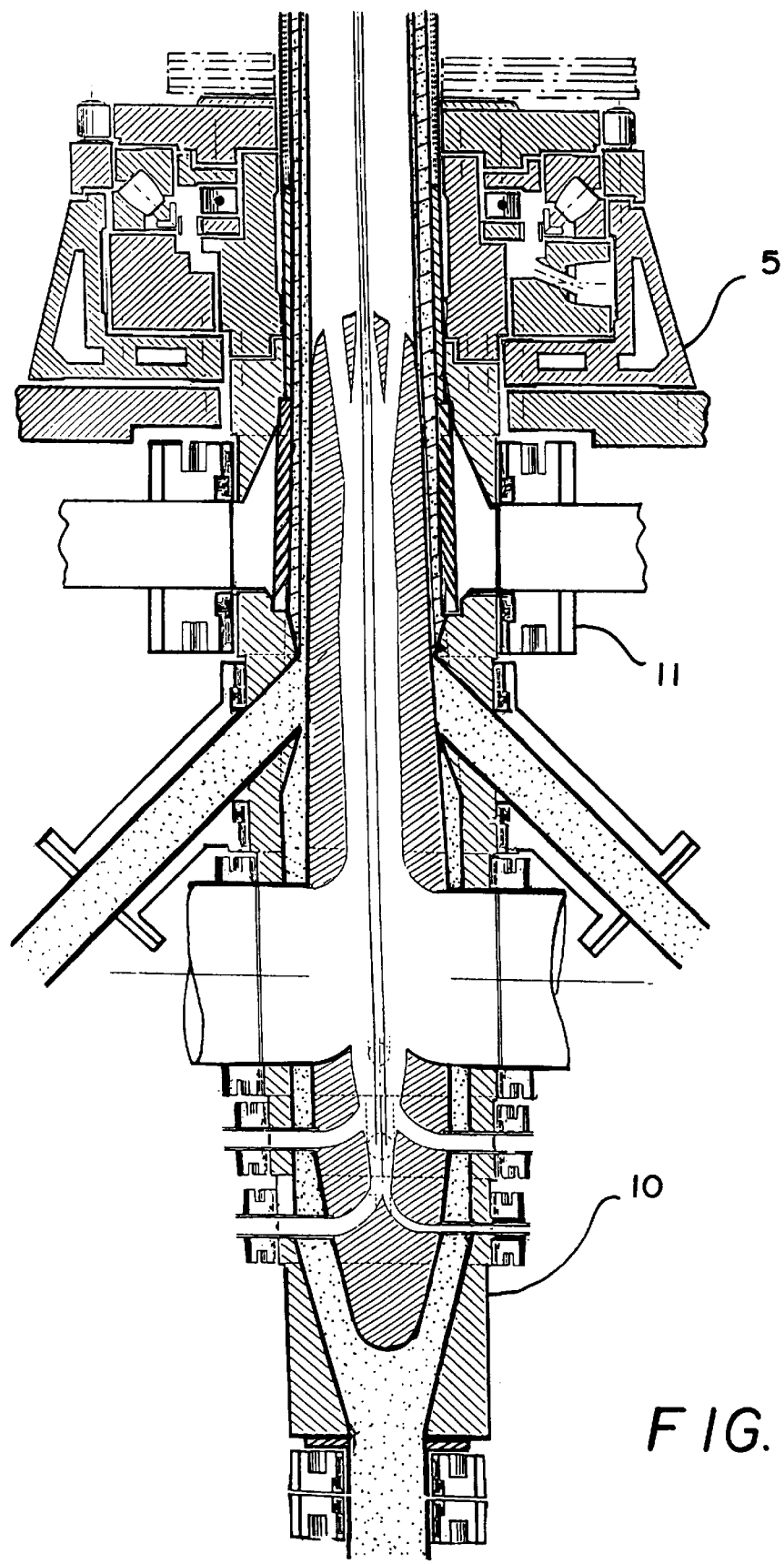
FIG. 3a is a cross-sectional view of a static extruder nozzle of this invention with a vacuuming port and chemical injection ports.

FIG. 3a is a cross-sectional view of the more complex rotary nozzle system (10) with mechanical seals (11) driven at (5) of Methods I and II.

Figure 3B:
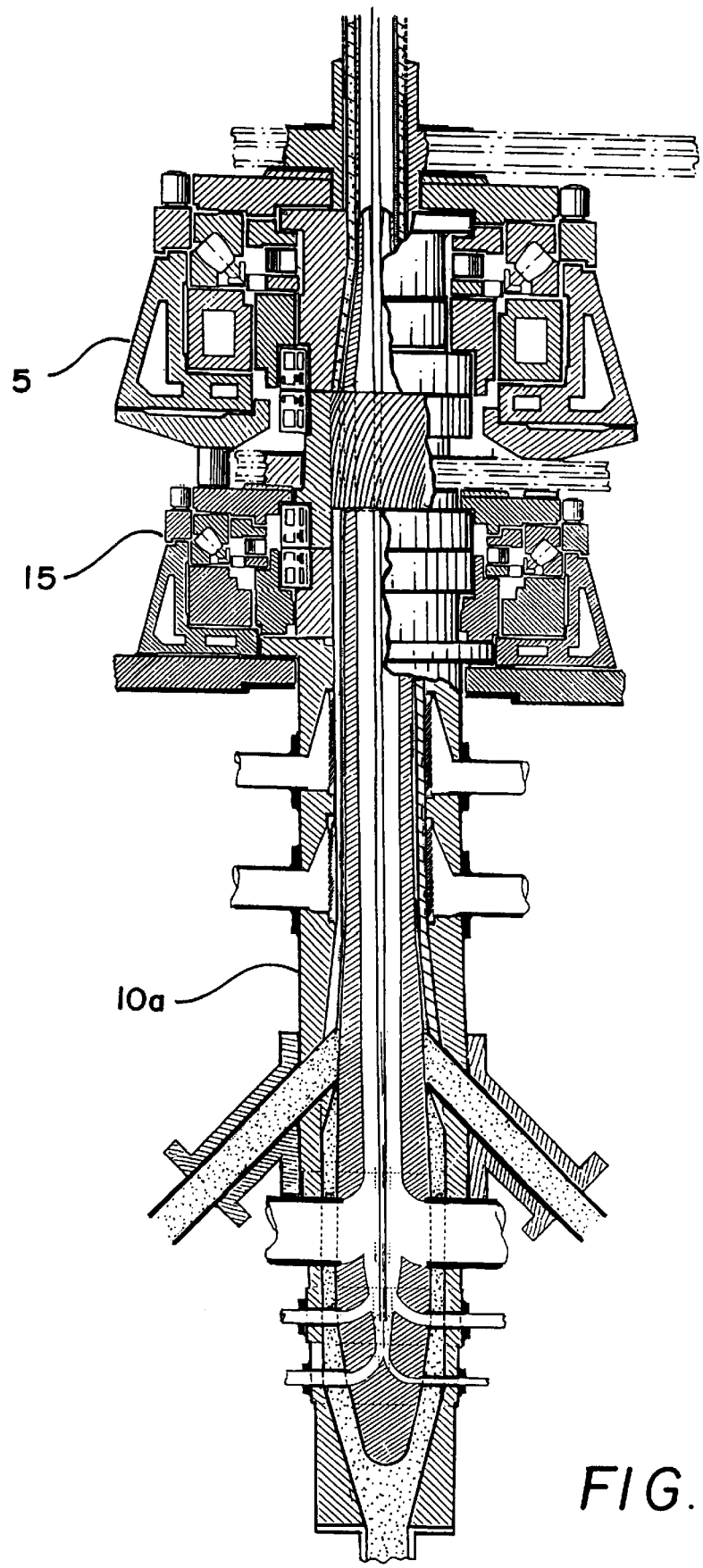
FIG. 3 is a cross-sectional view of rotating extruder nozzle of this invention with a vacuum port.

FIG. 3b is a high-speed (5), low-speed (15) drive, both of which are variable independently. These turn on a stationary nozzle feed section (10a) and is the preferred form for Methods III and IV.

Components of these are illustrated in detailed description in the following drawings.

FIGS. 4, 5, 6, 7 and 8 are illustrations of the rotating extruder nozzle apparatus used with Methods I and II.

In FIG. 4 the feedstock is shown at (1), the liner at (2), and the vacuum section at (3). At (12) is a tube with louvered openings that allows passage of the feedstock without destruction of its compacted form.

At (4) is a supporting structure that is now shown in detail, but is the fixturing that the nozzle hangs from.

(5) is the bearing assembly. (6) is the tapered bearing suited to maintaining the support load. (7) represents a series of cam follower bearings that supply added side support.

(8) is a chain drive. (9) is a heat adjustment to accommodate bearing heat expansion problems. (10) is the shaft-like extruder housing that is stepped in diameter to provide for each sealing assembly that serves for admission of gases and the extrusion materials. This shaft-like assembly is machined in quarters and assembled with porting in the periphery that permits the egress of gas, material and the vacuum function in rotational passage.

(11) is a mechanical seal suited to these needs and (13) is the steam injector that provides a 500 micron vacuum for air and moisture removal as the feedstock passes the louvers (12).

(14) and (18) in FIG. 4 are natural gas ports, (15) is for compressed air delivered from the multistage compressor and receiver at (20) of FIG. 6. (17) is the oxygen port in FIG. 4 and the tank (19) of FIG. 8 represents a source.

At (23) in FIG. 4 is a seal assembly used with this bearing that permits the introduction of compressed CO2 with an added oil mist that serves to cool the support bearing and provides lubrication. The tank of FIG. 7 (22) represents a source.

At (25) in FIG. 4 the fuels, oxygen and compressed air come together with the heat delivered from the firetube (30) that is also carrying water-gas. To overcome the pressures of the firetube delivery it is necessary that each of the gas systems be pressurized.

At the top of the FIG. 4 illustration the feedstock (1) and the liner (2) is shown at the point where it is entering the perforated portion of the standing Retention Tube (38).

At (26) is the location where the fusing of the liner into the inner surface of the feedstock commences.

(27) are the nozzle openings where ignition begins and (28) is the center tube that carries a mix of oxygen and compressed air upward and through the stack of ceramic bricks. Spaced openings in this pipe created a new flame burst at these points with oxygen infusion.

This nozzle is representative of what would be used as apparatus in Methods II and III. The three-dimensional view of the static nozzle in FIG. 2 shows a cutaway of the material passage path that is identical in both nozzles.

In FIG. 9 the generic heat, carbon production and gas handling apparatus of Methods I and II are shown. This is the equipment that has gas fractioning functions and that recirculates liquors into the Main Fractioning Chamber and also introduces steam to reduce the temperature of the inner surface of the Retention Tube. In these processes the emphasis is to intensify the liquors and gases by recirculation to some measured specific gravity and density before release. In the III Method emphasis is on superheat, minimizing moisture in the gas and quick delivery from the chamber that in this case has no fractioning and is designated the Main Gas Chamber (40).

In FIG. 9 the fire tube and mixing of gas is at (30) and the fires course upward through a series of spool-checker bricks (31) in the center of which a ported oxygen pipe adds flame bursts progressively to the top (28). The fire tube return is shown at the top of the illustration (30) and it encloses the water-gas tube (18) as gas is delivered from the coke spray (39a) from pipe (39) against coke (45) before it passes a rotating gas trap (32) that moves the coke from the gas generating chamber to a chute running to a conveyor. All gases are contained and even drawn off the storage where the coke falls and cools. This gas is usable as fuel and its steam content causes it to increase in pressure as it moves through the firetube (30) to venturi (34) which draws the water-gas from ports (33) into the firetube (30). A small portion of this gas stream is drawn off again (29) with a jet of water from injector (47) converted to steam in this nozzle that directs the high pressure steam jet angularly to create a directional gas flow around the Retention Tube (38) opposing its rotation and thus creating a scrubbing action.

Liquors (46) and tars (41) accumulate and the liquor is redirected to the top of the MFC to be sprayed into the hot gas mass at (46a).

Tars go to a decanter and storage.

An enlarged inset at (37) shows the steam jet heads used to cool the surface of the Retention Tube (38).

FIG. 10 shows the MFC (40) gas delivery side. At (1) and (2) the feedstock and liner are shown entering the Retention Tube (38). Gases are shown moving to the center of the unit at (14) and (17). The fire tube (30) is carrying water-gas (18) as it enters the bottom and mixes prior to ignition with flame entering the bricks at (31). The rotation drive is shown at (8). The jet stream of gas is shown at (42) where it enters cooling chamber (49) after a dwell at (50) then exits to be divided. Coke is shown at (45) and stack damper at (16). The I Method assumes some stack loss while Methods II and III contemplate a fully closed system. (35) represents diverted stack gas that moves to a scrubber.

FIG. 11 shows enlarged detail of the eddie current effect of part (50) that delivers gas from the inside of the MFC and MGC units to a port for exiting. The arrowed path (55) of FIG. 12 represents movement of the gas (42) as it spins above the port (56) before exiting. FIG. 13 (60) is a Thermal Diffusion molecular mass separation unit. The gas (42) enters the cooler space (49) in bursts provided by the pulsing of valve (51) controlled by circuit (52) that opens one valve at a time using power of source (53) and the switching of commutator (54).

The chamber (49) cools the gas slightly as it passes into the entrance of the Thermal Diffusion Unit which has a cool center part (58) and a hotter outer shell (59). The heavier gases are attracted to the cooler part and are repulsed by an electric charge which delivers them downward toward an accelerating electron beam device (57) where they exit as a heavier molecular gas (42b). The lighter molecular mass gases are attracted to the outer wall of the enclosing chamber and repulsed from the center but move upward to a like accelerator (57a) that expels them from the unit as a (42a) gas.

Figure 15:
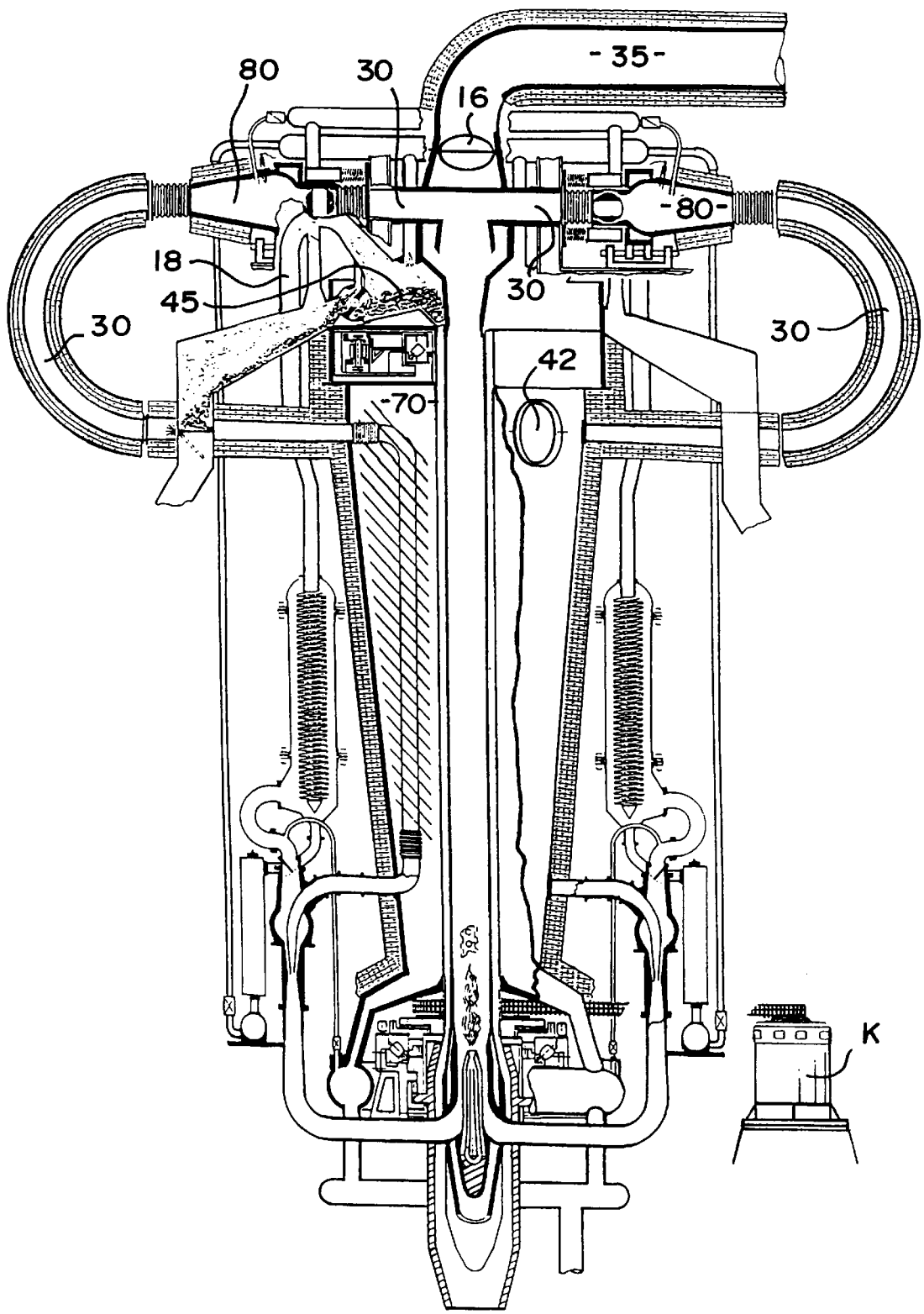
FIG. 15 is a cross-sectional and schematic illustration of Firetube Circulatory Ramjet system, Gas Superheating Plates mounted on the Firetube, Water-gas Condensation System, Carbon Takeoff and Liquor/tar Downcomers as components of the embodiment of the invention.

FIG. 15 is a general schematic drawing of the Method III apparatus which follows much of the procedure of the Methods II and III but introduces a powered fire tube using a Ramjet (80) to deliver a high velocity hot gas stream through the system (30). Coke or soft char is produced in the normal manner at (45) and water-gas (18). The MGC chamber is different and has no fractioning like that of the MFC of Method I and differs internally which is shown in detail in FIG. 18. Flue gases are restricted by damper control at (16) and the flue gas produced (35) is sent to a scrubber with return to the MGC when clean. The generated gas (42) leaves the top of the unit at the single port shown. Power source is at (K).

Figure 16:
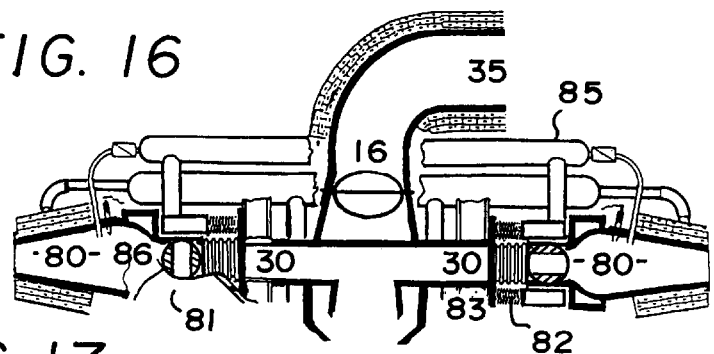
FIG. 16 is a cross-sectional detail view of the Ramjet engines for Firetube drive, the Water-gas fuel source and the Pulsing Valves for their control.

FIG. 16 illustrates the Ramjet Engine (80) of Method III which uses water-gas or natural gas (85) as a fuel which is intermittently ignited by spark plugs (86) after pulsing valves close at (81). When opened these valves admit an amount of fire tube heat and then close, fuel is introduced and a jet burst to the fire tube (30) results from the explosion creating the pulse. There is substantial thrust which can be simply anchored and the vibrational shock taken by bellows

Figure 17:
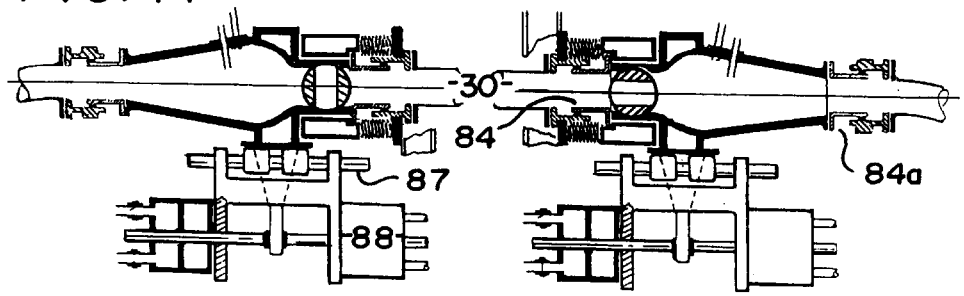
FIG. 17 is a cross-sectional detail view of the Ramjet engines of FIG. 16 using hydraulic or air cylinders to arrest thrust and create an energy source.

(82) and springs (83) to minimize motion. However, this energy can be used as shown in FIG. 17 by allowing some limited movement on linear bearings (87) as support and by providing sliding seals (84) and (84a) of sufficient length to permit this oscillation. The force is then applied against hydraulic pistons in a reciprocal double action. This thrust is great enough to provide pressure in a hydraulic accumulator to power needs for auxiliary equipment.

Figure 18:
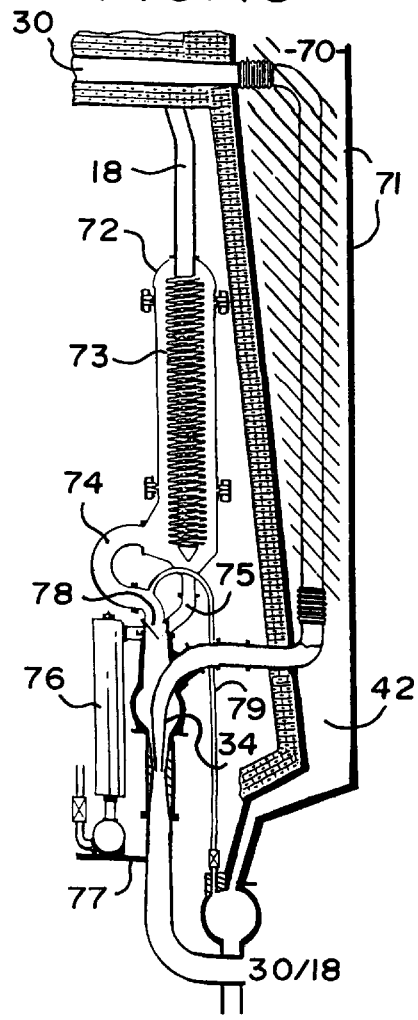
FIG. 18 is a cross-sectional detail view of the Water-gas-steam Condensing System and the Firetube Plate Vane Apparatus for gas superheating.

FIG. 18 illustrates the interior form of the MGC unit in which the fire tube gas (30) moves through the chamber and carries heat to transfer plates (71) that are angularly placed to cause gases to flow upward as they are heated by this means. This tube exits the chamber and enters a venturi (34) which provides a vacuum to draw down water-gas (18) which courses through a closed end holed tube within coils (73). This unit is held in a tank (72) and functions to remove the steam-water from the gas (18). The tube holes of (73) cause the water gas to contact the cold coils and leave the moisture which drops through pipe (74) past check (78) to the venturi (34) and beyond to return to the system (30)/(18). The water drops through pipe (75) to pump-head tank (76) and pump (77) to return to the system. At (79) the venturi (34) draws off the gases accumulating on top of the liquor through this pipe as well.

Figure 19:
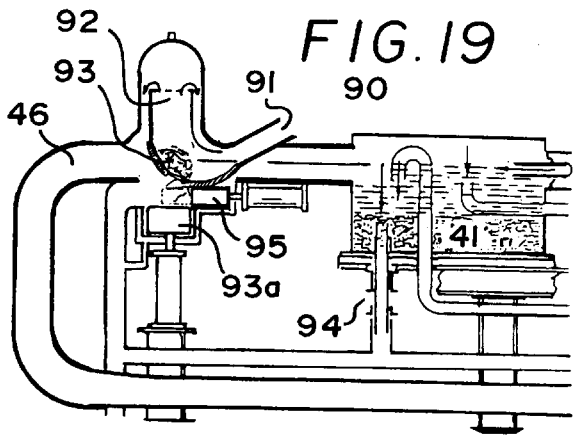
FIG. 19 is a cross-sectional detail view of a Liquor Handling Apparatus for tar separation.

FIG. 19 shows a rather typical tar collection unit (90) with improvement in tar separation. At (91) the liquor and tar is received and drops to a low point (93) where the tar settles. The liquor overflows at (92) and moves into the system at (46). Tar (41) accumulates normally in a decanter tank, but some is removed from the stream by a device at (93).

Figure 20:
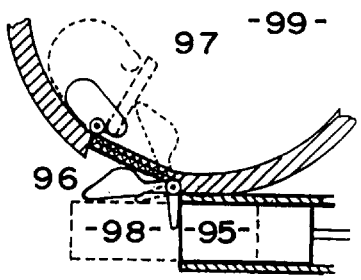
FIG. 20 is a cross-sectional detail view of the Valving Apparatus for tar separation of FIG. 19.

FIG. 20 shows the detail of this unit (99) which has a pair of timed reciprocating pistons one of which (95) moves a shaped block across the face of a cylinder which receives tar on this face at (93a) FIG. 19 which is moved by the other piston that pushes the tar into a receiver pipe. The tar has dropped on this cylinder head because the piston (95) in its motion (98) has opened a trap (97) by actuating a trigger (96).

Figures 21, 22:
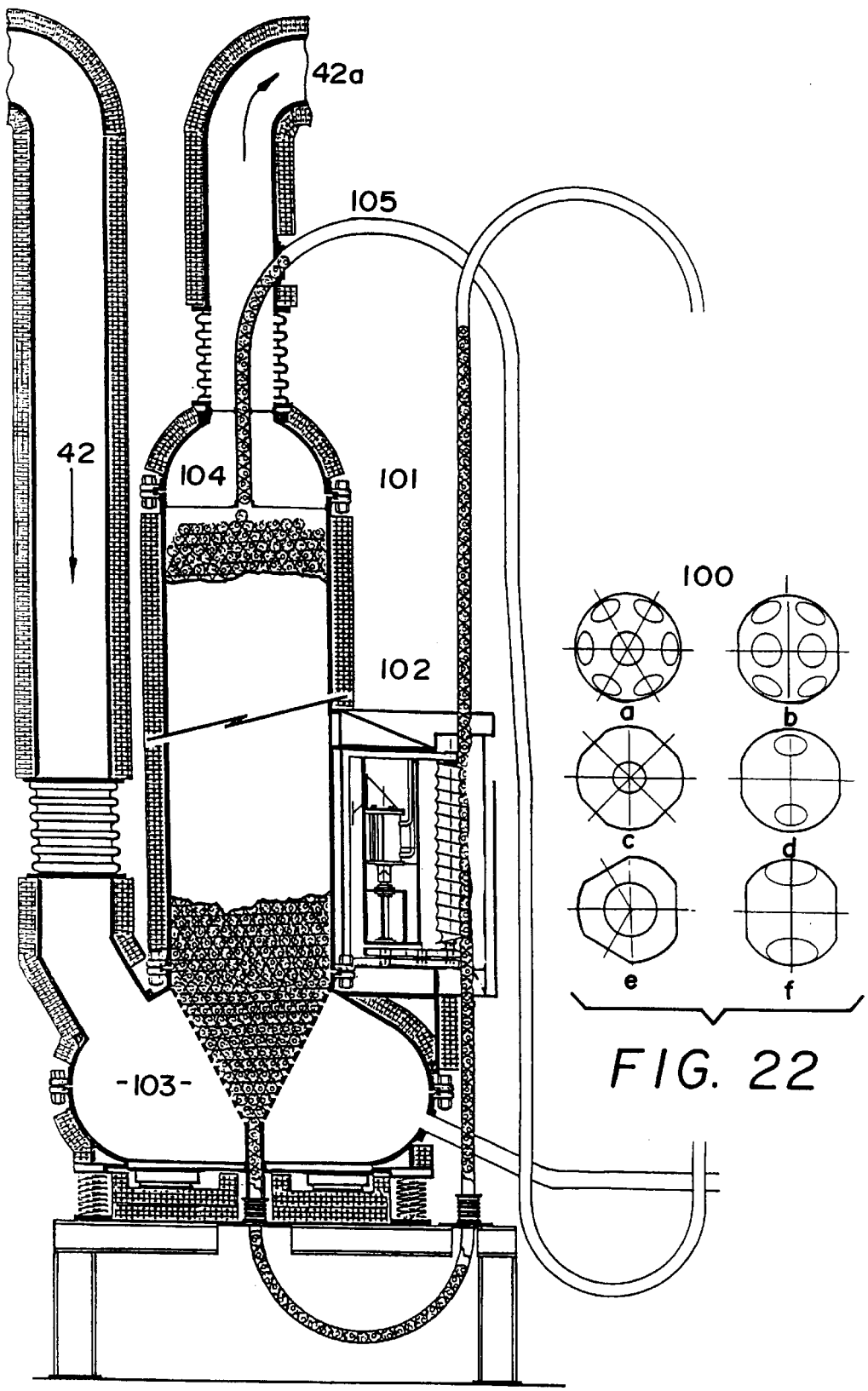
FIG. 21 is a cross-sectional view of the Gas Particulate Removal System showing the transport of gas through a plurality of hollow Sphere Media balls for non-contaminated gas cleaning.
FIG. 22 is a series of plane view illustrations to show the geometric limitations of nole configurations in the Spheres of FIG. 21.

FIG. 21 illustrates a Gas Cleaning System that performs without liquids. It is based on the use of a ball media as shown in FIG. 22. Forms of these sphere shapes are shown as a, b, c, d, e and f. These are hollow with a thin wall and holed to a specific size in respect to diameter so the flattening effect of holes can be avoided as shown in all but the (a) configuration. This is the preferred form used in this apparatus.

The apparatus itself as shown in FIG. 21 which admits gas (42) at the bottom where it passes through sides of a funnel-like shape that is perforated and that holds balls that are slowly settling from above. These are drawn out and up through pipe (101) by screw unit (102).

The balls of FIG. 24 (100a) form are used in the cleaning operation. When returned from the cleaning function of FIG. 23 these drop into the top of this unit through pipe (105) to fall at (104). The gas (42) as it moves upward through this array of hollow, holed balls slows and the particulate from the gas is attracted to the ball surfaces by charges on these surfaces. The clean balls are then at the top where the clean gas exits at (42a) for final treatment.

Figure 23:
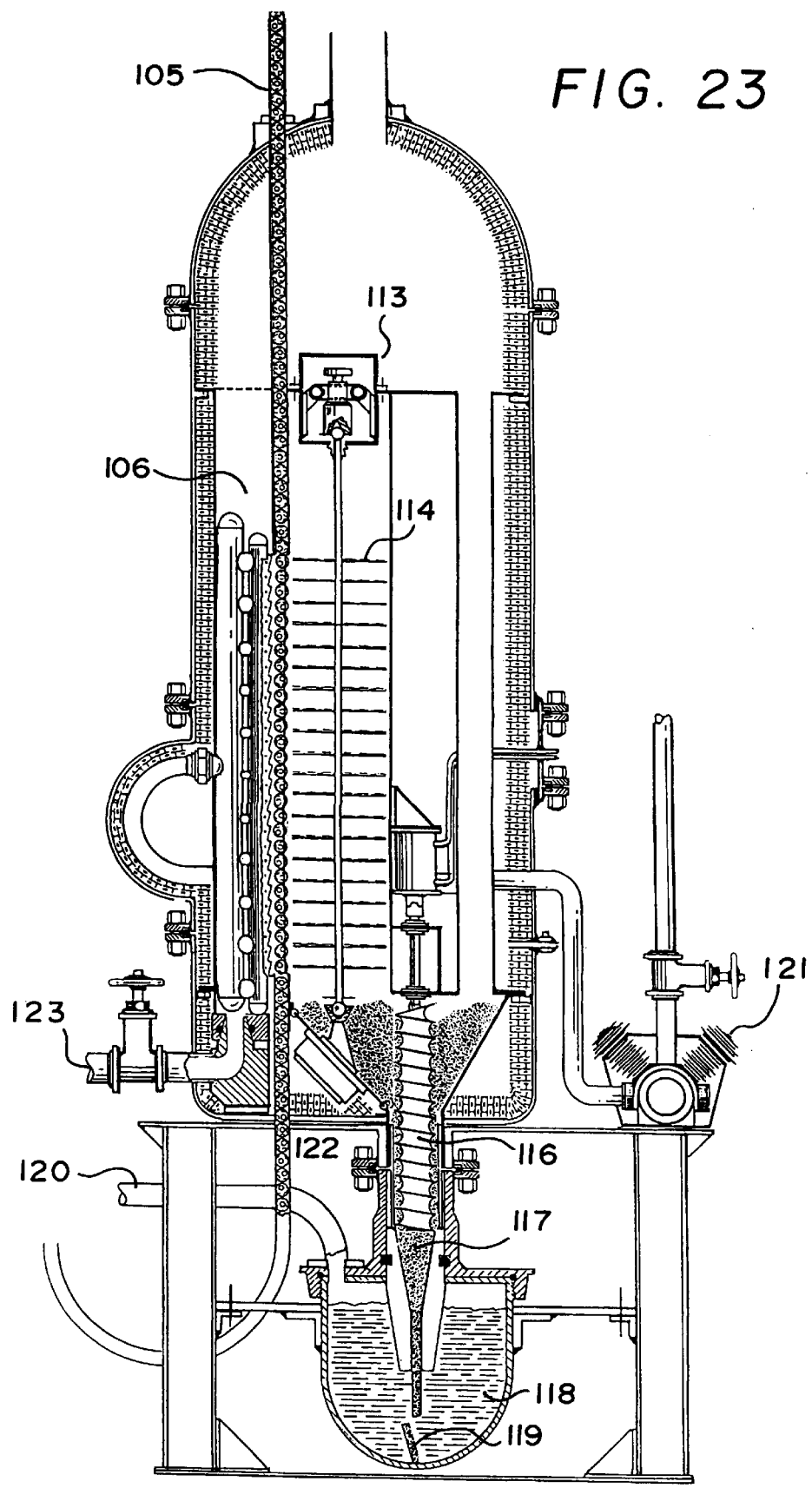
FIG. 23 is a cross-sectional view of an apparatus in which the Spheres of FIG. 21 containing gas particulate are cleaned with gas blasting so particulate can be recovered.

FIG. 26 shows an enlarged view of this ball cleaning operation comprising a type of "air-knife" blasting of individual surfaces as the balls pass shaped orifice slits (111) through which pressurized CO2 (121) FIG. 23 is driven against them. They are held against a pair of rails (109) and the accumulated particulate streams past these as it is driven off through a gate slot (110). Slit pressure is maintained uniformly using manifolds (106), (107) and (108).

Trays like that of FIG. 25 (114) are mounted loosely on a center rod support that is control-vibrated (113) FIG. 23. These slow the gas carrying the particulate so it can settle and drift to the bottom of the unit. The balls enter the system at FIG. 23 (105) and drop past the manifold and knives where the tube carrying them opens and the rails support the balls for a considerable distance opposite the knives and vibrating trays (114). Particulate accumulates in a funnel in the center of which is a small extruder screw (116) that drives and compresses this very hot powder to recover the trapped gases and CO2 at (117). The extruded cylinders (119) drop into water for cooling and further gas is released to be carried off for storage. Gases are captured at the base of the unit at (120) and taken off the unit through a top opening to be returned to the system via the stack gas collection, ahead of the scrubber. Finally all of this gas is returned to the bottom of the MGC.

With internal leakage detected, steam purging is done with valve (123).

FIG. 27 shows the gases divisions (42), (42a) and (42b) optionally introduced to Cyclotron treatment section of Method III through a Laminar Flow Control device (61) and (61a) illustrated here for continuity. (A co-pending application describes a molecular stratifying system that applies here.)

With flow controlled, the gas moves as in FIG. 28 into a Cyclotronic Magnetic Separation System (64) where molecular separation occurs and the various mass divisions are then passed through valves (65) to chiller coils of FIG. 29 (67) served by piping (66) after which the gas is compressed and delivered to cold pressure bottle receivers (69) to dissipate the heat of compression. Also as a part of FIG. 29 a steam purging valve is shown at (sv), a pressure exhaust blower as (pb) and a purging main as (pm). These are for leakage emergency and for shutdown.

FIG. 30 (62) again shows a cross-section of the magnet and cyclotron unit and the slotted openings around the annular side of the circular spectral gas receiver (66). The manifold controls and valving is shown at (65) and (65a). These are shown enlarged in FIG. 34. The purpose of this complex valving fixture is to provide 38 controlled gas receiving points which can be individually combined when a wider gas-type spectrum occurs and a like gas falls out at several valve points.

FIG. 32 shows the iron structure of the magnet in cross-section at (64) and the magnetic field of influence at (64a). A three-dimensional view shows the poles (64b) and the peripheral vertical iron rectangular panels for magnetic field coupling at (64a).

FIG. 31 is a perspective drawing of the magnet assembly (64) showing poles (64b) and the slotted magnetic circuit partitions (64a).

FIG. 33 is a top view of the cyclotron unit with the 38 divisions and the injection of gas at point (66) and (66a) FIG. 35 after which it divides by molecular mass and weight to fall out in a spectral division within the inner circle of this unit as shown in FIG. 35 at (63) and (69).

Figure 36:
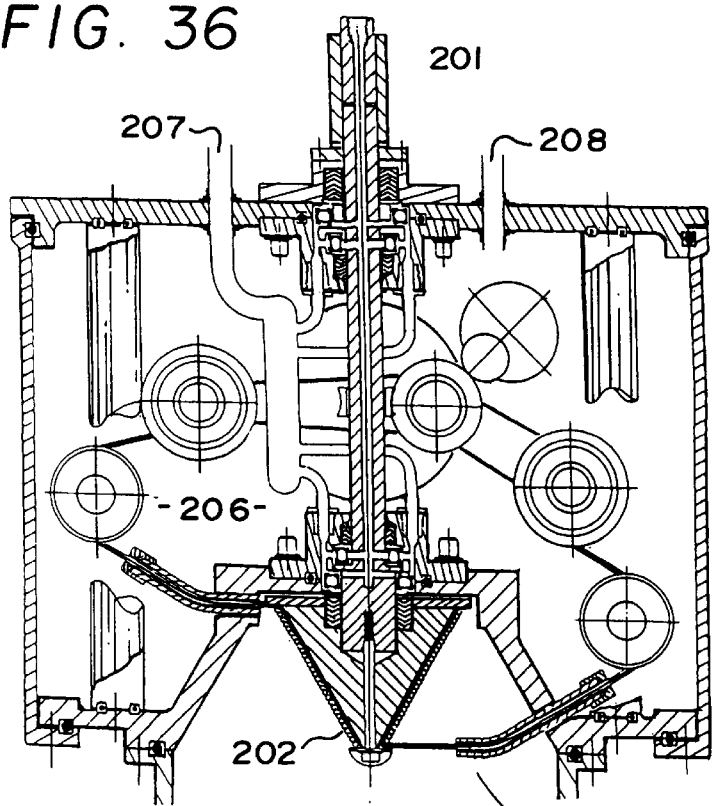
FIG. 36 is a cross-sectional and schematic top view of the gas pressurized apparatus of the renewable cathode mechanism showing the Cone-Capstan Shape, wire drive, seals and rewinds.

The gas (42) is prepared for this insertion by passage through the flow control FIG. 33 (62) apparatus described earlier followed by an electrostatic system (201) shown in detail in FIG. 36.

Figure 38:
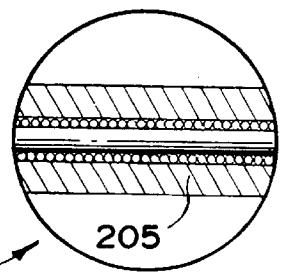
FIG. 38 is an enlarged cross-sectional illustration of the sealing apparatus through which the Cathode wire passes into the hot gas chamber.
Figure 37:
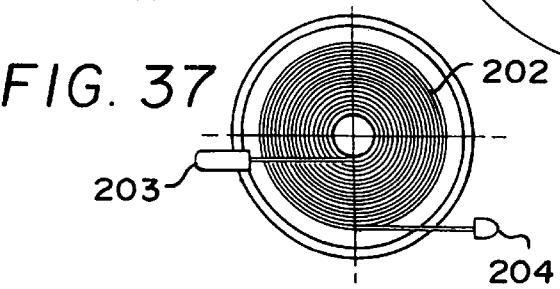
FIG. 37 is a plane front view of the Cone-Capstan on which the Cathode Wire winds.

FIG. 36 is a chamber (206) that is evacuated and pressurized with CO2 (207) and exhausted at (208) in a pressure-controlled circulation procedure. This prevents possible gas contamination of the working parts in this unit which comprise a motor unit and gearing to drive a wire winding unit (202) at a very slow speed so a renewable cathode is provided to interface the gas stream of the system. This comprises a small gauge metal wire which is drawn from a reel and rewound on another reel inside this unit. The wire is pulled through a tightly coiled spring seal of some length FIG. 38 (205) that provides friction control and also a limited leak seal. An Octal type oil mist driven into the unit with the CO2 lubricates all these functions. FIG. 37 shows a face view of the cathode as it appears to the gas with the seal feed (203) and take off at (204).

Figure 39:
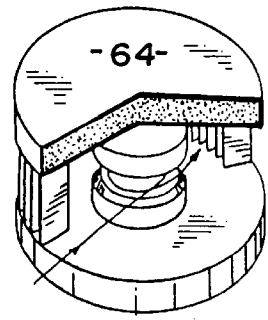
Figure 40:
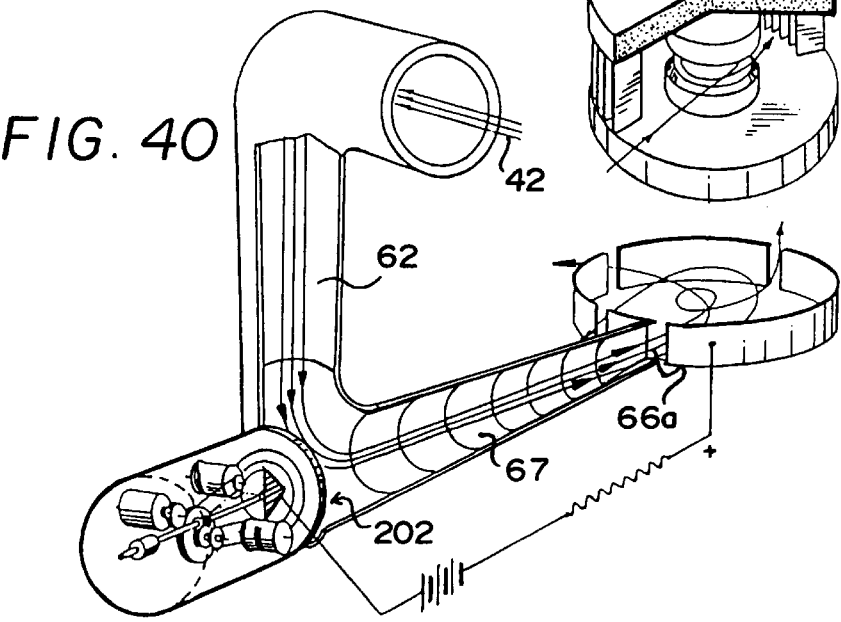
FIG. 40 wnich is a three-dimensional view showing the hot gas passage, the position of the Renewable Cathode mechanism and the Cyclotron Gas Separation Unit.

FIG. 40 shows a schematic illustration of the gas entering the cyclotron pathway (67) and curving past the cathode (202) where it enters an electron storm that provides the electrical charge to the gas molecules as they finally enter the magnetic field at (66) of magnet FIG. 39 (64).

Figure 41:
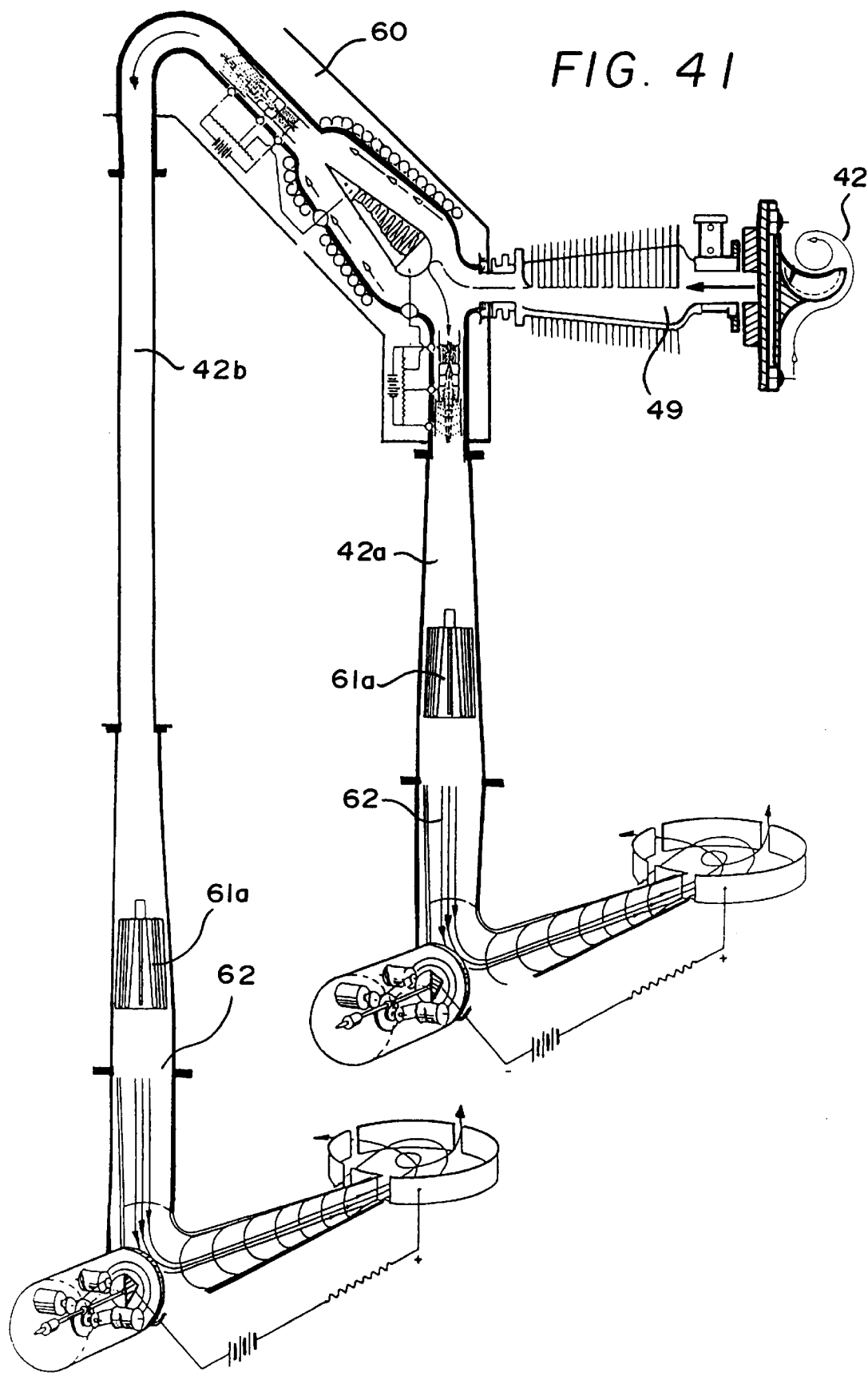
FIG. 41 is a schematic assembly that shows in combination the gas passage through the Thermal Diffusion Unit, Flow Control Apparatus, past the Renewable Cathode Ionization Wire exposure and into the Magnetic Field of the Cyclotron for division of gases by molecular weight.

FIG. 41 is a schematic illustration of an optimum arrangement using the combination of Methods II and III in which the Thermal Diffusion System is used to make a rough mass separation of gas in two parts followed by a pair of Spectro Cyclotronic Systems, one dividing the lighter mass molecules and the other the heavy into finite divisions as described earlier.

Figure 42:
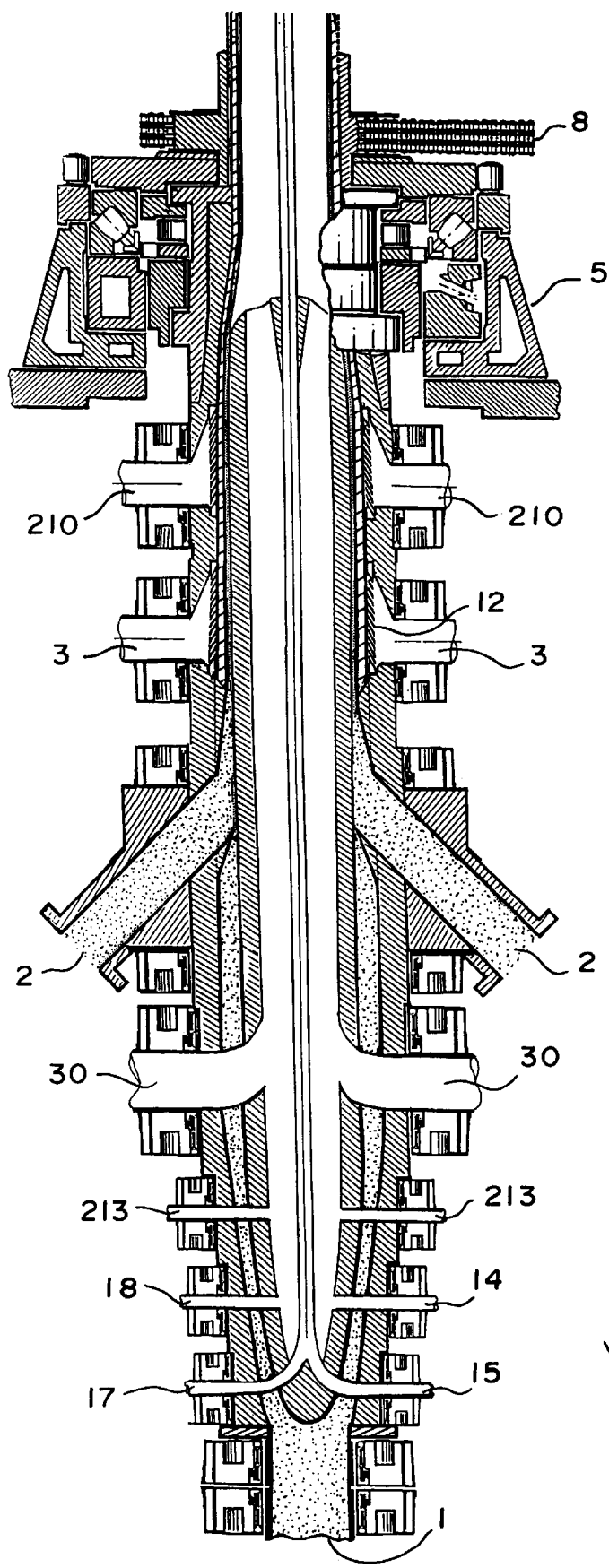
FIG. 42 is a cross-sectional illustration of a Rotating Extruder Nozzle with vacuum means and a plurality of gas introduction ports all with mechanical sealing means.
Figure 43:
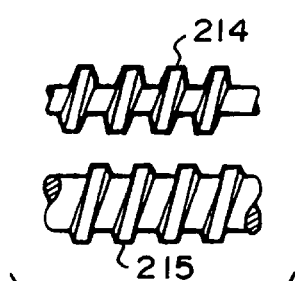
FIG. 43 is a schematic inset of the extruder (not shown) and the type of diminishing screw used to provide pressure to the extrusion.

FIG. 42 is a cutaway view of a nozzle configuration which receives the feedstock from the extruder at (1) that compresses it by the action of the extruder screw as shown in FIG. 43 inset (214) representing the exit end and (215) the egress.

Natural gas is introduced at (18) water-gas mixed in through port (14), compressed air at (17) and oxygen at (15). This nozzle has an additional port to admit another gas for combustion at (213).

The fire tube egress is at (30) and the second lamination material liner is introduced at (2). Vacuum provisions exit at (3) and grating/feedstock interface at (12). An additional pressurized gas can be added to the feedstock (as for example the addition of hydrogen to coal). The entire nozzle assembly hangs from the bearing support (5) and is driven by chain drive (8). Seals are provided at each porting egress as described earlier in FIG. 4, (11).

Figure 44:
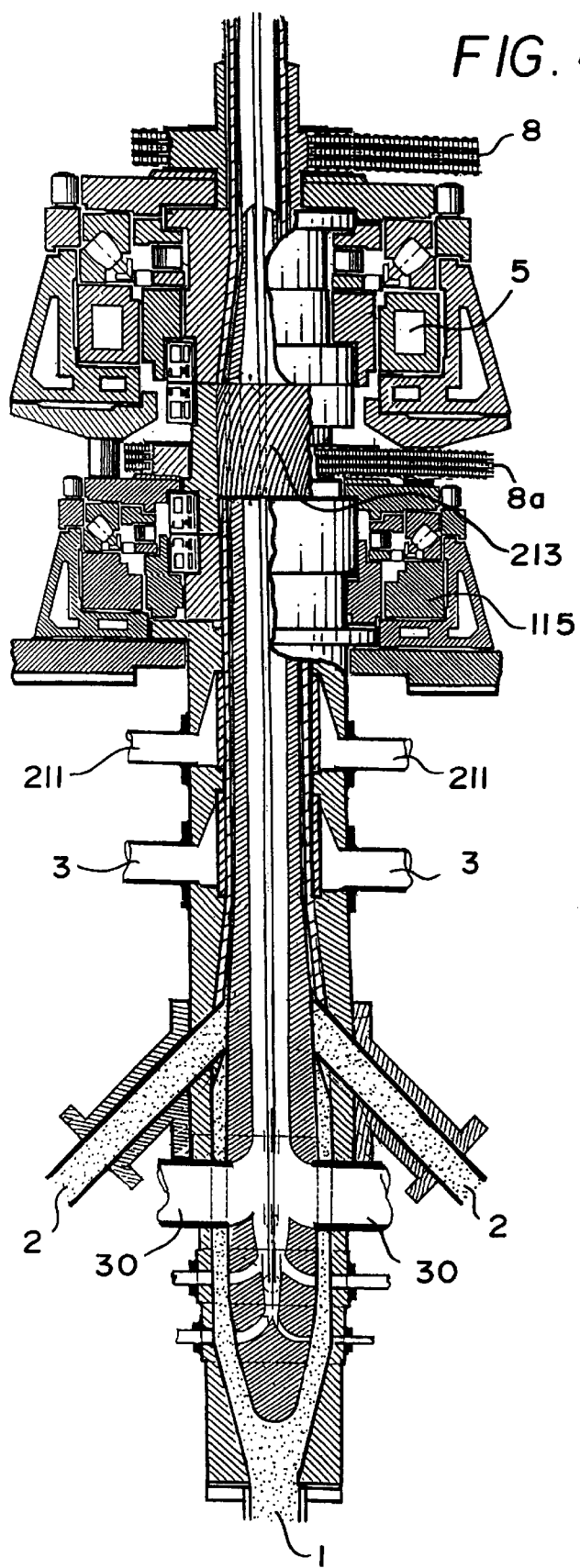
FIG. 44 is a cross-sectional schematic illustration of a Two-Speed Drive Apparatus that provides transition from the static extruder nozzle shown to the rotating Feedstock Media Support Tube mounted at its top.

FIG. 44 is another extruder nozzle apparatus in which the nozzle portion connections to all of the porting is stationary. These are as described earlier in FIG. 42 except there are no rotary mechanical seals as in that nozzle, the body of which rotates.

The nozzle of FIG. 44 has two additional features. The extrusion exiting to the perforated retention tube provides two speeds. The extrusion material is forced into a space between the inner fire tube wall and a rotating section member about one foot long that has a helical involute serration on this I.D. as shown exposed at (213).

Figure 45:
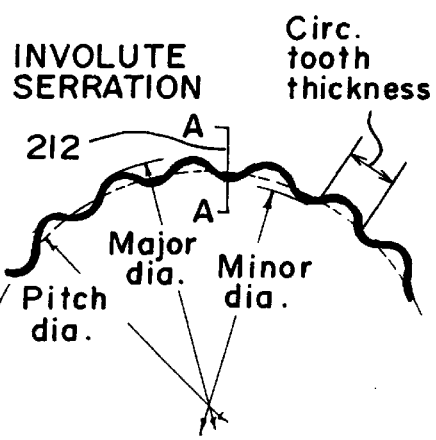
FIG. 45 is a cross-sectional view of the Rotating Involute Serration Tube Section inside the transitional speed-drive of the FIG. 44.

Its corrugated surface FIG. 45 (212) at engages the compressible feedstocks O.D. and with its slow speed begins a twisting action to cause rotation of the feedstock and its liner around the polished outer surface of the fire tube wall.

Figure 46:
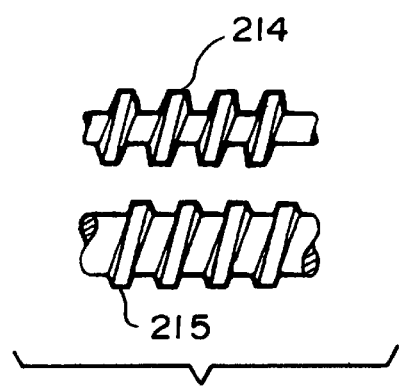
FIG. 46 inset indicates the type of extruder feed required to drive this nozzle.

The feedstock has acquired this corrugated shape on its O.D. as it now enters the high speed rotation of the unperforated bottom portion of the retention tube. At first only the raised lands of the feedstock corrugations slide inside the retention tube, but the taper reduces here as the feedstock compresses and leaves the nozzle and is exposed to the fire. This compression force, as provided by the extruder as shown in FIG. 46 (214) and (215) accelerates the movement of the feedstock upward, smooths out the impressed corrugations and the interface of the feedstock and the retention tube achieves full engagement and a common rotational speed.

The slow speed bearing assembly is shown at (115) and supports the retention tube assembly above it at (5). Both are driven independently by variable speed drives, the slower at (8a) and the fast at (8).

Figure 47:
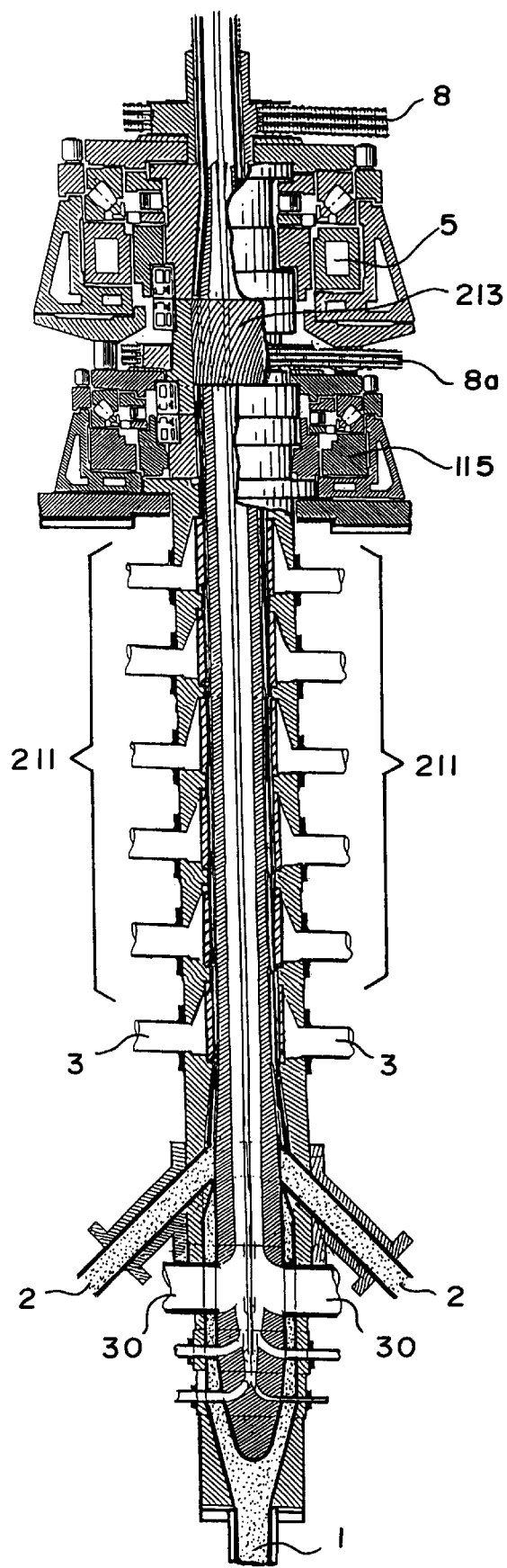
FIG. 47 is a cross-sectional view of a Static Extruder Nozzle like that of FIG. 45 equipped with the standard vacuum ports but with the addition of a plurality of gas injection ports.

FIG. 47 is a cutaway view of a nozzle that is identical to that of FIG. 44 with the exception that this nozzle has a plurality of ports (211) for the introduction of a variety of gas to the feedstock immediately after the vacuum ports at (3). This provides ability to enhance the feedstocks make-up prior to firing so that the final product combines these new gases with those extracted.

Figure 48:
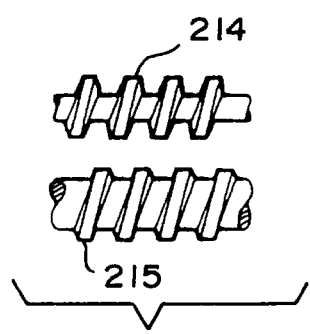
FIG. 48 inset indicates the type of extruder feed required to drive this nozzle.

As in FIG. 44 this unit has the dual speed features, and the extruder that precedes it must have the compression features as in FIG. 48, (214) and (215).

Figure 49:
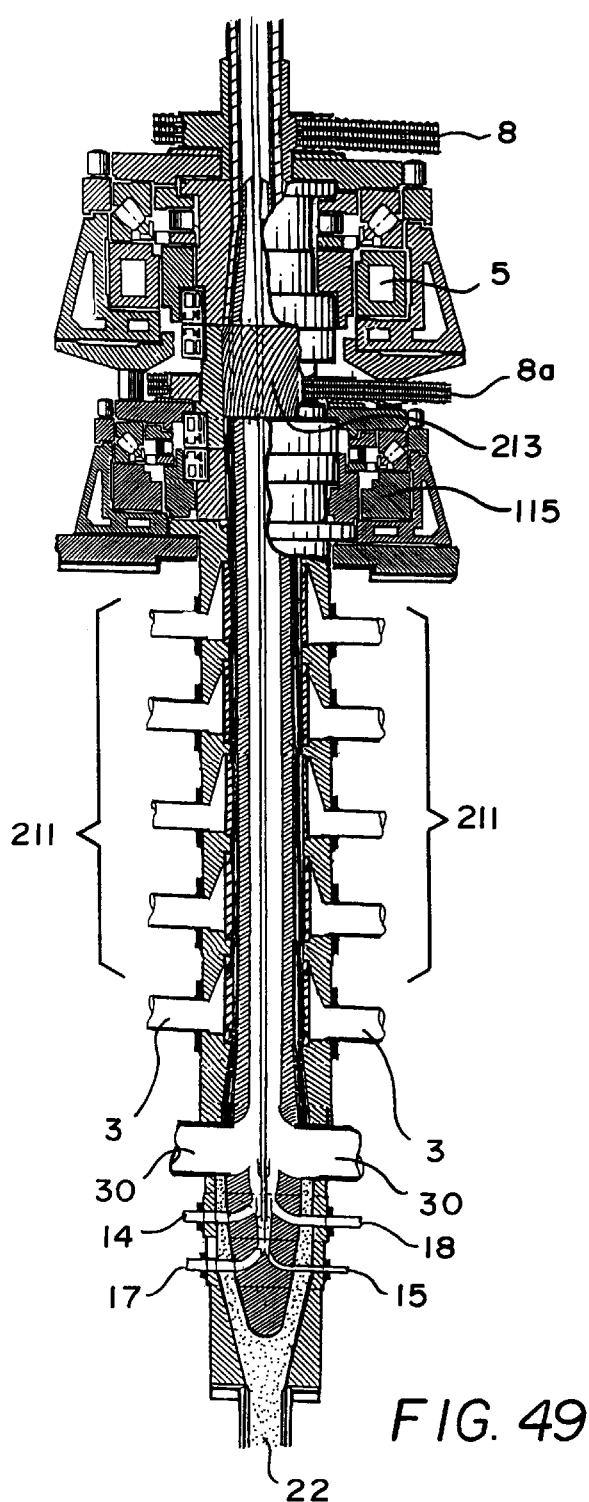
FIG. 49 is a schematic and cross-sectional illustration of a Two-Speed Drive mounted on a Static Nozzle with vacuum and gas ports, but with only one extrusion input as used in the cold gas conversion for liquid recovery embodiment of this invention.
Figure 50:
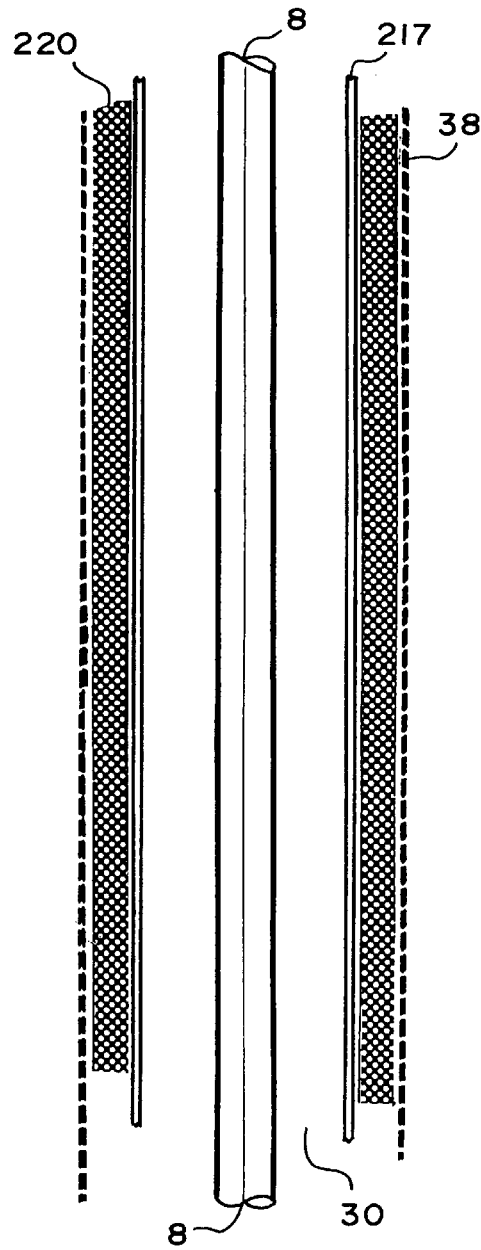
FIG. 50 is a cross-sectional illustration of the normal Perforated Feedstock Media Support Tube of the embodiment, but enclosing an Internal Tube interfacing the Feedstock Media to carry coolant which returns to source in the pipe at the center.
Figure 51:
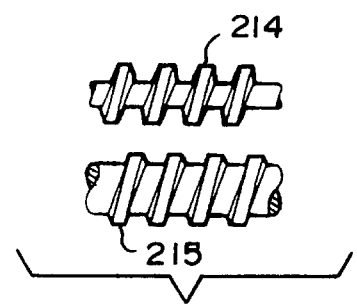
FIG. 51 inset shows a form of compression feed that can be used with this nozzle.

FIG. 49 is very like the nozzle of FIGS. 44 and 47, including the ability to add gases (211) but here there is only one extruder rather than a plurality. This extruder must have compression features as did the the others as shown at FIG. 51 (214) and (215). In this extrusion there is no feedstock liner as it is replaced by a stationary metal innertube member. FIG. 50 (217) extends optionally to the top or only part way.

It functions to carry the fire and heat which is conducted to a feedstock or in the same space a media material can be a carrier to hold reactive chemicals or gases that are subjected to this fire tube heat (30) and oxygen stimulation (8). An end product is extracted from the feedstock and processed as shown in Method IV FIG. 60.

Some compression is used here in the combination of these feedstocks or media materials, and the product gases are taken off through the perforations of the retention tube FIG. 50 (38) which can be enclosed in an evacuated space or in other cases provided with zone pressurization using rotary seals working against unperforated sections of the O.D. of the retention tube. These sections provide catalystic exposure while the pressure holds the material from leaking out of the perforations.

Figure 54:
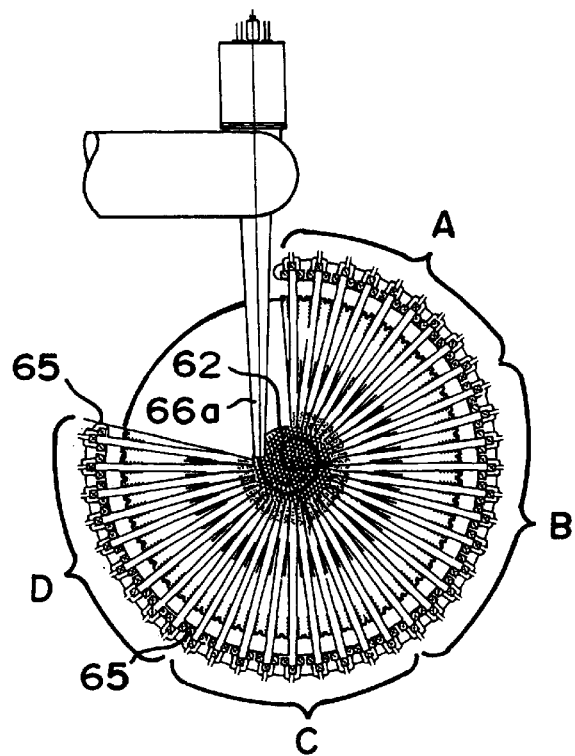
FIG. 54 is a plane top view of the Cyclotron.
Figure 55:
FIG. 55 is an elevation view of the Steam Ejector for Vacuum application to the nozzle.
Figure 57:
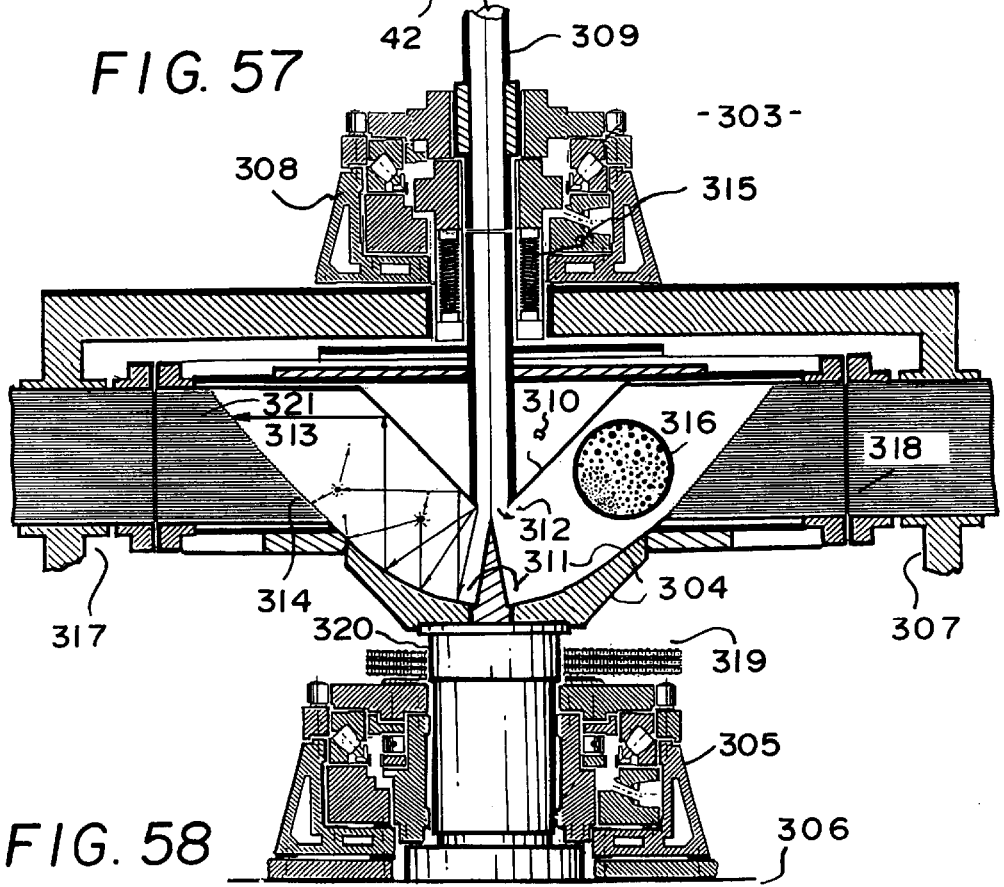
FIG. 57 is a cross-sectional and schematic view of the Centrifuge/Parabola apparatus for the division of gas molecules into strata by weight.

FIG. 52 illustrates the nozzle function of the Method IV process in which the gases developed in the Method III process are divided by molecular weight using collimating means FIG. 57 to stratify the ionized molecules by mass followed by waveguide-like slit orifices that direct these ions to a magnetic field FIG. 32 (64a) in a cyclotronic action FIG. 54 (66) for division into discrete mass groups FIG. 65 (a), (b), (c) and (d).

In FIG. 53 (61) a gas moves through a laminar flow control to maintain accurate flow rates. At the same time temperature and pressure controls are carefully held to very tight limits. They are subjected to ionization treatment as described earlier in FIG. 36 (201) and, before entering the magnetic field of FIG. 53 (62) (64), the gas is directed to flow through a section FIG. 57 (303) which consists of a system that reverses the direction of flow 180 degrees within an expansion space of substantial size that is rotating at high speeds and has escape openings around its periphery that lead to orificing before the cyclotron.

Figure 56:
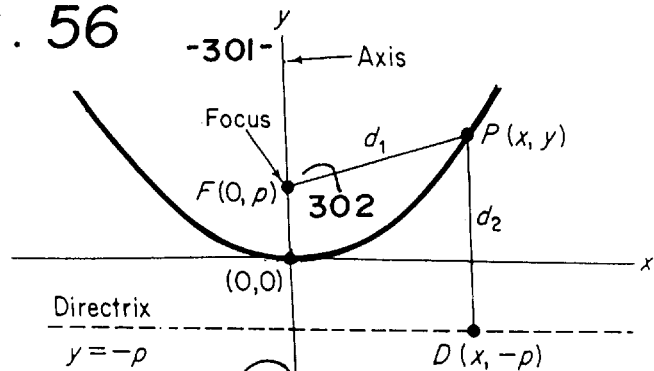
FIG. 56 is a schematic illustration of the parabola form and "focus-point" in the Molecular Separation System embodiment.

The gas of this section is directed into a parabola like that of FIG. 56 sketch (301) which is a deep bowl configuration with the focus as shown at (302).

A cross-sectional view FIGS. 57 (303) shows the working elements of the flywheel-like unit for gross separation of the various gas masses in this near-plasma gas cloud of various molecular weight that are in the stream (342) as it enters the system.

The gases move from a fixed piping system (309) through a rotating mechanical seal (315) into space in a flywheel-like apparatus that a mechanical bearing and shaft support (305) that is of great strength and mass resting on a foundation at (306). It is driven by a representative drive source (319)

through a speed increaser planetary gearing (not shown) in the housing (320). The central shaft of this unit supports a large diameter parabola shape (304) which in turn supports the continuous upper surface of the parabola form or armature (314).

Figure 58:
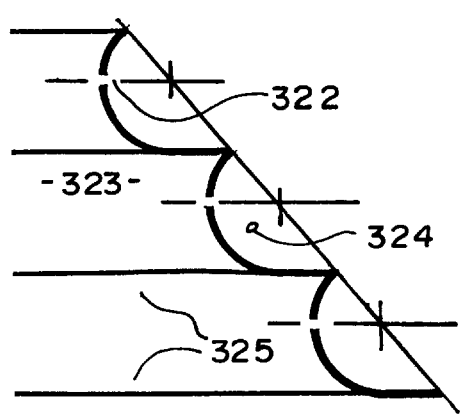
FIG. 58 is an enlarged view in cross-section showing the Horizontal Slit Openings that receive the molecular weight divisions as part of the parabola inner contour.

The upper face parabola portion FIG. 57 (314) is shown in FIG. 58 in cross-section. The upper portions of the parabola surface interfacing the gas have finite openings FIG. 58 (322) between a large plurality of horizontal disc-like components (321) and (325). The outer periphery of these meet like-openings in a 360-degree stator (318) so the slits align at a mechanical adjoinment comprising a precise seal that has no friction fits which is the subject of a copending apparatus patent application.

The stator unit is supported with a bridge unit held on stantions (307) and (317). This bridge support holds an upper bearing assembly (308) that holds the mechanical seals of (315) and suitable bearings.

The gas (342) driven downward into this system is split at a tungsten focus point (312) and strikes the parabola surface of (304) in space (311) that together with expansion provides a redistribution of mass order caused by laminar influence in pipe transit. The hot gas mix is suddenly under the influence of a strong centrifugal force as the whole gas body swings around a center with a total diameter in the order of twelve to fifteen feet. As the molecules strike the parabola's (304) surface they rebound in a direction opposite to their original path and confront an inverted conical shape (310) with sides at 45 degrees from the perpendicular. Those molecules with new free paths that do not strike others (minimized by the extreme expansion occurring) bounce again from this surface and are redirected to the exit area FIG. 58 (324) in the parabola face and finite opening FIG. 58 (322). [It is the inventor's belief that, while infinitely small, some influence of the centrifugal force will be felt by these molecules held captive in a moving space.] This effect should be proportional to their individual mass and weight. This then implies that the heavier molecules will accumulate at the outer diameter and the lighter ones distribute themselves proportionately closer to the center as at inset FIG. 57 (316) and exit through the appropriate slits (312) to create a strata of gas separation.

In the preferred form of the apparatus of this invention (which is shown in detail in co-pending patents) thirty-eight ½" concave surfaces (324) flank the openings (322) which are 0.048" wide slits into ½" spaces (323) between discs. These slit openings provide an area greater than that of the 12" high pressure gas line intended to feed this system so the volumes of gases as received in the expansion area can pass.

Figure 59:
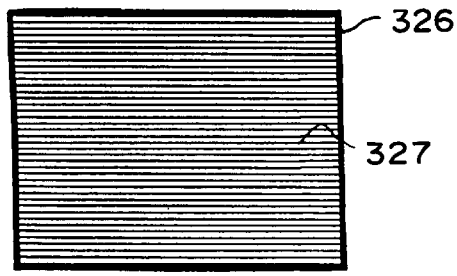
FIG. 59 is a plane view of the open end of the waveguide-like port that delivers the divided horizontal gas-weight division strata as seen looking upstream from the peripheral edge of the magnet of the Cyclotron.

FIG. 59 is a view (326) of the final tube-end appearance at the cyclotron FIG. 52 (64c) and the proportions of the final openings FIG. 59 (327) as derived from the accumulating tubes that gather these separated gas stratas.

At the end of the section (62) planes of gas of different mass and weight are then deliverable in horizontal layers relative to the perpendicular and uniform magnetic field in the cyclotron as described earlier in FIGS. 30 through 35.

In FIG. 54 a plane view of the magnet (64) shows the multi-plane waveguide-like tube (66) that delivers the ionized molecules of gas into this magnetic field to spin out to a variety of gates ending in a manifold capturing system.

For simplicity these are shown as represented by pipe FIG. 53 (65a) which is typical. All these pipes are groups with molecules in spectral fall-out selections. In FIG. 54 these are grouped as A, B, C, and D. In the "D" group for example the manifold valves (65) located at each end of this group have been selected to isolate the mass weight coming into this spectral section. As shown here the "D" piping is carried in two pipes to the nozzle unit. "A" group is carried in three, "B" in six and "C" in three. The manifold valving permits any grouping.

The piping ending in the nozzle of FIG. 52 has 16 ports for egress, but there could be 38 ports or one for each pipette in the cyclotron.

Almost certainly the spectral fall-out would reduce this number substantially.

This nozzle is somewhat like those described for heat applications. It has two variable speeds and also a vacuum system at (3). A cold gas or liquid is circulated through this system as at (218) and (219). There is only one extrusion material introduced and this is not a feedstock but instead a media material or carrier that is re-used (220).

Gases are introduced in the piping as shown. The extruder feeding this material is not compressing and is only providing motion. The restrictions of the nozzle speed passage rather than function to compress the media.

FIGS. 60 and 61 illustrate all of the ancillary servicing features of Method IV respecting the media handling and recovery for re-use.

The media FIG. 60 (220) is introduced from the nozzle structure. Unlike the fire tube of the hot system the center member of this cold operation functions to carry the cooling gas or liquid (218). It extends to a point just below perforations (230) that are near the top of the retention tube (222). It ends here under a cap that closes off the bottom section of the retention tube, and the cooling material overflows the (218) center tube and returns in the annular space (219) between it and (222).

Gases have been introduced at the nozzle at high temperatures. This has occurred just after the media has been evacuated.

The gases are in effect "leaked" into the voids or the interstices of the media which is under a partial vacuum. After the gases are introduced to the media there is some mixing action in the transition from the static nozzle to the rotating retention tube (which in this case is moving very slowly).

What follows is a procedure that provides a rolling or churning of the media as it is pushed upward between the turning retention tube FIG. 61 (222) and the stationary center tube (221). The inner surface of tube (222) and along its whole length, until it reaches the perforations at the unit top, has convex half-ball like features (231) in a size 3/16" to ½" diameter. These ball diameters in (231) match longitudinal corrugation grooves (253) in the center standing tube carrying the coolant. The half-ball surfaces (231) are well clear of the corrugation surfaces (253). The media which can be balls or another form is forced to move upward. The convex ball alignment and their surfaces in (222) are in a helical pattern and the screw-like rotation is turned in a direction to force the upward-traveling media down in opposition to the extruded direction.

The corrugations produce a mild shearing condition when the high lands pass the half-ball surfaces, and the opposing forces of the helical screw and the extruder pressure cause one complete rotation of the media mass in the space of one helical diameter turn. This then is a gentle mixer and the material captured within this mass is churning and cooling until it becomes a liquid and reaches the perforations at FIGS. 60 and 61 (226). Here the newly-formed liquid leaks out of the perforations and is captured in stationary tray FIG. 60 (223).

The space outside the perforations (240) is a vacuum tank evacuated by steam injectors (241) and the liquids extracted are briefly retained within this space in an outgassing function in tank receiver (232) as syphoned from the tray (223). The liquid flows from the bottom to storage outside through pipe (234) and a check valve at (235) (not shown) to prevent air pressure backup. Tank (232) is heated by coils (233).

As the media reaches the open top of the extention tube it is forced out into a large hopper area over a perforated bottom (225) and residual liquid leaks (227) out these perforations into pipes (224) and into tray (223) and beyond to storage.

An auger-like flight-screw (228) draws the wet media (220a) down to a rotary trap (229) that limits vacuum loss and the media progresses at (220b) sliding down a chute within a vented space (242) from which fumes are drawn off by pressure blowers (243). A similar vented space also marked (242) is a vent pipe from the drying section (248). This vapor passes to a condenser and the liquid is added to storage.

The media at (220b) fall down a series of inclines (244) where a solvent spray (237) washes it in passage and assists its movement. This liquid comes from a manifold (236) to spray heads (237) from piping (238) and solvent pump (239). The media and solvent mass fall into a hopper containing a second flight-screw (245) operated by hydraulic motor (246) to draw the wet media up and into a chamber (248) where a high pressure hot air blast blows the material upward in a drying phase (220c). The vent of the tower (242) is guarded by a shield (247) so the dry media falls to a hopper unit (249) and out the bottom (220d) for return to the extruder. The hot air comes from compressor tank (250) and air heat exchanger (251) and through the pipe to pressure nozzle in tank (248).

FIG. 62 is a schematic illustration of the Process II configuration showing the feedstock stream to carbon residual and the gas transit through the cleaning steps. The flow control is shown at FIG. 63, and cyclotron separation at FIG. 64 and chill compression storage at FIG. 65. Details have been shown earlier.

Figures 67, 68:
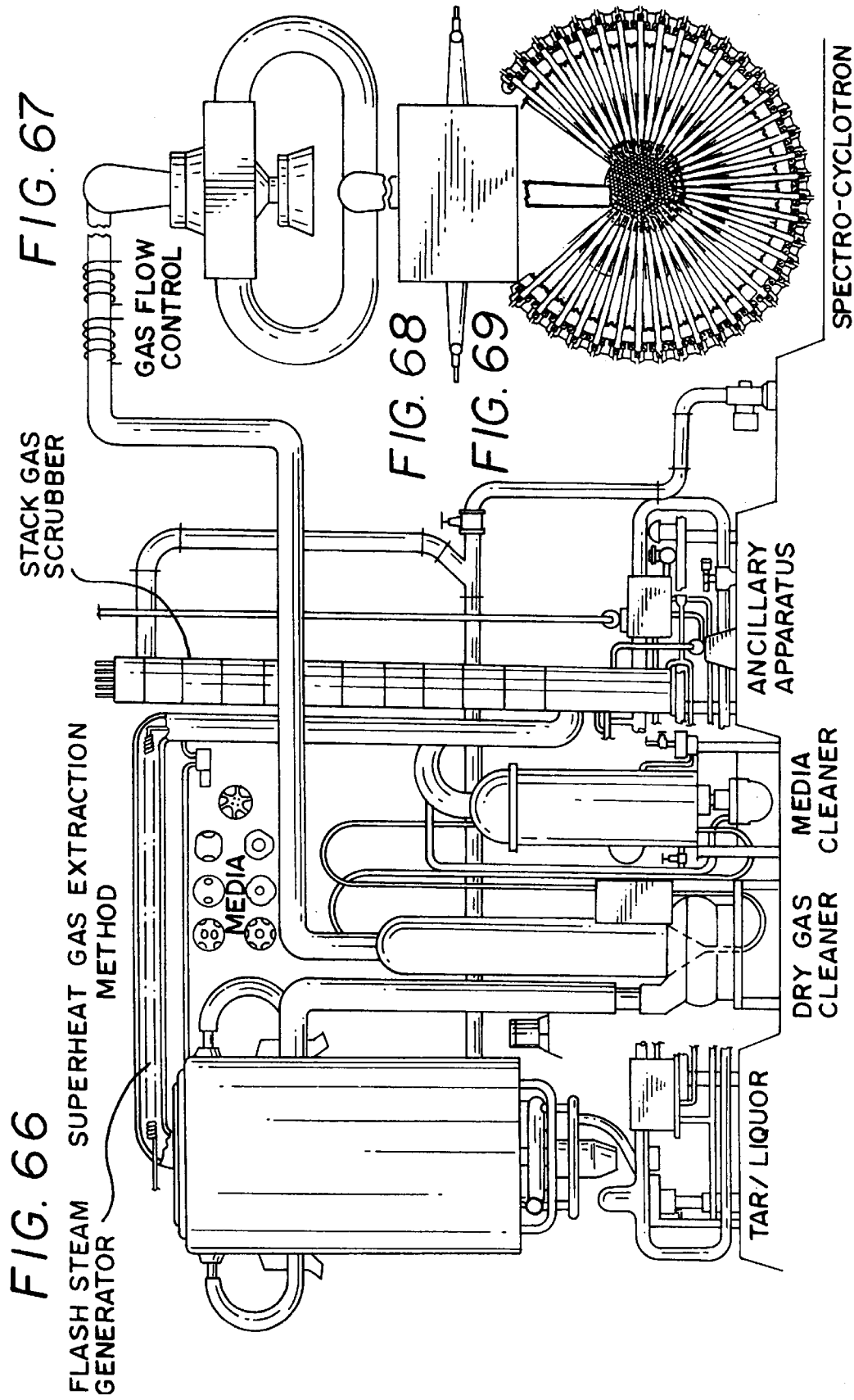

FIG. 66 is a schematic illustration of the Process III configuration showing the feedstock stream to flow regulation and centrifugal/parabola system FIG. 67, the cyclotron phase side elevation at FIG. 68 and the plane top view of the cyclotron configuration at FIG. 69.

Figure 70:
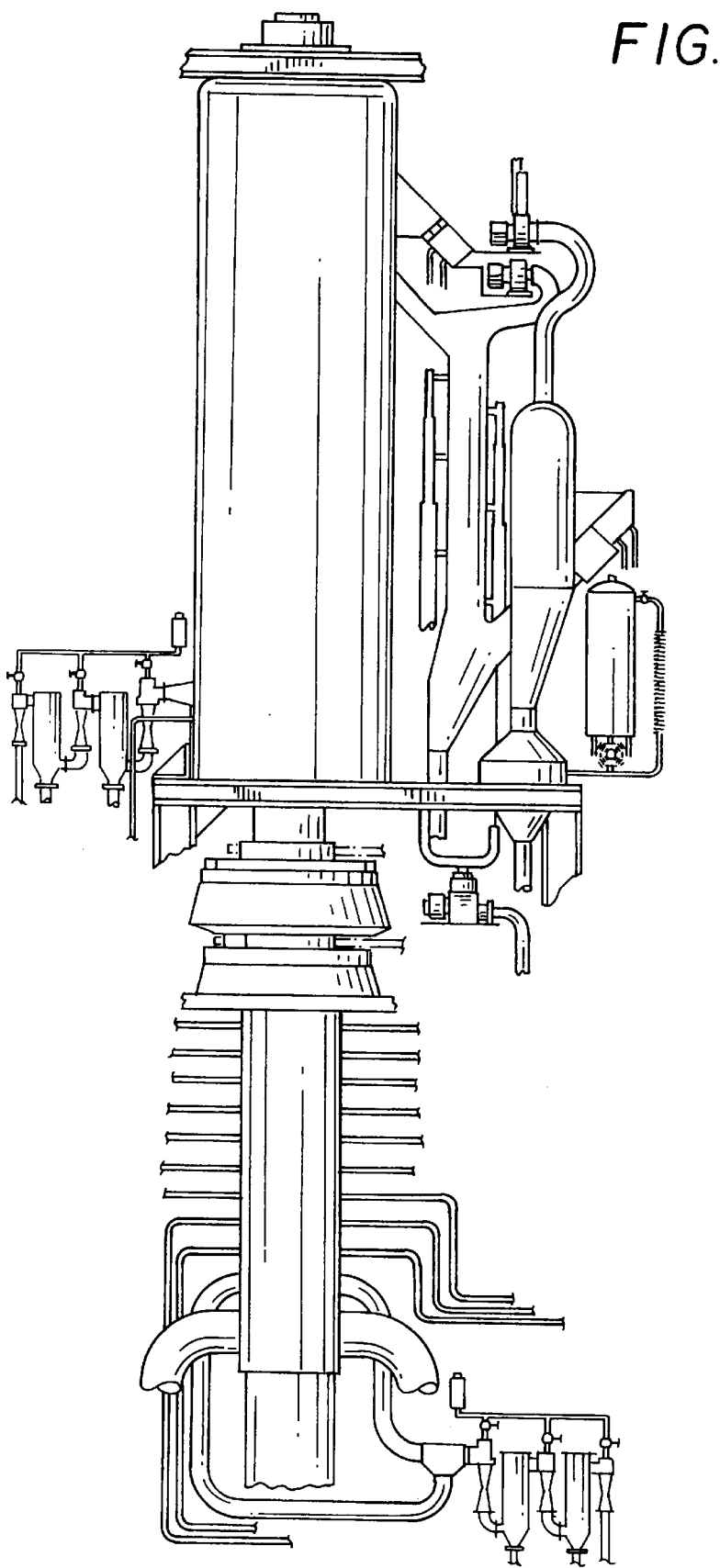
FIG. 70 is a cross-sectional schematic view of the Cold Inert Feedstock Media recovery process shown mounted on the gas input nozzle and two-speed drive mechanism to provide the circulation means for the Feedstock Media.

FIG. 70 is a schematic illustration of the flow of gases as introduced at the bottom of the illustration into the media extruder and the subsequent cold treatment with reduction to liquid extraction and subsequent cleaning of media. Again, the detail of these various steps has been described earlier and these figures are to help in understanding the chronology of the processes.

I claim:

1. A method of extruding and rotating an extrudable material to form a tubular structure, said method comprising:

extruding said material through a nozzle into a first tube having an inside surface with at least one spiral corrugation for causing the extruded material to rotate and form a rotating tubular structure having a corresponding convolution on an outer surface and a hollow interior chamber defined by an inner surface of said tubular structure; and discharging the tubular structure from said first tube into a rotating second tube, said second tube rotating at a higher speed than said rotating tubular structure and having an inner surface of decreasing taper from inlet to outlet such that said convolution is compressed and the rotational speed of the tubular structure is increased by said second tube.

2. An extrusion method according to claim 1, wherein the inner surface of said rotating second tube is substantially smooth, and said tubular stucture remains in said rotating second tube for a time sufficient to substantially eliminate said convolution on said outer surface of the tubular structure.

3. An extrusion method according to claim 1, wherein said tubular stucture remains in said rotating second tube for a period of time sufficient for said tubular stucture to achieve a rotational speed substantially equal to said higher speed.

4. An extrusion method according to claim 1, wherein said extrusion nozzle is a stationary nozzle and said first tube rotates.

5. An extrusion method according to claim 4, wherein the corrugated inside surface of said rotating first tube has a plurality of corrugations providing a plurality of convolutions on the outer surface of the tubular stucture.

6. An extrusion method according to claim 5, wherein the corrugations of said rotating first tube extend transversely relative to a rotational axis thereof and have a spiral form such that said convolutions have a corresponding spiral form.

7. An extrusion method according to claim 1, wherein said extrudable material contains a heavy fraction of greater density than a lighter fraction, wherein said rotating second tube has a perforated section downstream of said tapered section, and wherein said extrusion method comprises the further step of separating said heavy fraction from said light fraction by discharging said heavy fraction through the perforated wall of said perforated section.

8. An extrusion method according to claim 1 further comprising the step of heating said tubular stucture by passing a heat producing medium through said hollow interior chamber.

9. An extrusion method according to claim 1, wherein said extrudable material comprises a combustible material and a heat resistant material, and wherein said extrusion step extrudes said heat resistant material as a protective layer inside of a layer of said combustible material such that said inner surface of the tubular stucture is provided by said protective layer.

10. An extrusion method according to claim 9, wherein said combustible material comprises an organic material and said heat resistant material comprises an inorganic material, and wherein said heating step provides sufficient heat to said combustible layer to reduce at least a portion of said organic material to carbon.

* * * * *